(12) United States Patent
Kim et al.

(10) Patent No.: US 7,487,430 B2
(45) Date of Patent: Feb. 3, 2009

(54) APPARATUS AND METHOD FOR RECEIVING PACKET DATA CONTROL CHANNEL IN A MOBILE COMMUNICATION SYSTEM

(75) Inventors: Se-Hyoung Kim, Seoul (KR); Woo-Sang Hong, Songnam-shi (KR); Ji-Won Ha, Seoul (KR); Sang-Min Bae, Kyonggi-do (KR); Jin-Woo Heo, Songnam-shi (KR); Soo-Bok Yeo, Songnam-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 942 days.

(21) Appl. No.: 10/397,522

(22) Filed: Mar. 27, 2003

(65) Prior Publication Data

US 2003/0188252 A1 Oct. 2, 2003

(30) Foreign Application Priority Data

Mar. 27, 2002 (KR) ...................... 10-2002-0016858
Oct. 9, 2002 (KR) ...................... 10-2002-0061590

(51) Int. Cl.
*H03M 13/00* (2006.01)
*H03M 13/03* (2006.01)
*H03D 1/00* (2006.01)

(52) U.S. Cl. .................. 714/779; 714/795; 714/758; 375/341

(58) Field of Classification Search .................. 714/776, 714/758, 797, 774, 819, 755, 779, 807, 748, 714/746, 795, 796, 701; 375/341, 265, 262, 375/819
See application file for complete search history.

(56) References Cited

U.S. PATENT DOCUMENTS 5,923,713 A * 7/1999 Hatakeyama ................ 375/341
5,982,822 A * 11/1999 Hatakeyama ................ 375/341

(Continued)

FOREIGN PATENT DOCUMENTS

CN 1306351 8/2001

(Continued)

*Primary Examiner*—Phung M Chung
(74) *Attorney, Agent, or Firm*—Roylance, Abrams, Berdo & Goodman, L.L.P.

(57) ABSTRACT

An apparatus and method for receiving control information transmitted from a transmitter using one of a plurality of slot lengths in a high-speed packet transmission mobile communication system is provided. The apparatus and method includes a decoder adapted to receive symbols by the slot, and generate at least one bit stream by decoding as many symbols of at least one possible slot length among a plurality of slot lengths according to a previous decoding result. An error checker adapted to perform error checking on the bit stream from the decoder. A controller is adapted to provide symbols of one more consecutive slot to the decoder, if the error checking failed, and acquire control information from the error checking-passed bit stream, if the error check passed. The decoder is further adapted to output at least one frame quality metric for the bit stream along with the bit stream. If the number of error checking-passed bit streams is larger than or equal to 2, the controller compares frame quality metrics for the bit streams and selects one bit stream having the maximum frame quality metric in order to acquire the control information.

43 Claims, 11 Drawing Sheets

U.S. PATENT DOCUMENTS

| | | | |
|---|---|---|---|
| 6,094,465 A * | 7/2000 | Stein et al. | 375/346 |
| 6,356,595 B1 * | 3/2002 | Czaja et al. | 375/262 |
| 6,798,736 B1 * | 9/2004 | Black et al. | 370/208 |
| 6,804,220 B2 * | 10/2004 | Odenwalder et al. | 370/337 |
| 6,870,890 B1 * | 3/2005 | Yellin et al. | 375/340 |
| 6,928,065 B2 * | 8/2005 | Logalbo et al. | 370/337 |
| 2003/0007476 A1 * | 1/2003 | Kim et al. | 370/342 |
| 2003/0086385 A1 * | 5/2003 | Kwon et al. | 370/320 |
| 2003/0103480 A1 * | 6/2003 | You et al. | 370/335 |
| 2004/0218570 A1 * | 11/2004 | Black et al. | 370/335 |

FOREIGN PATENT DOCUMENTS

| | | |
|---|---|---|
| EP | 0763902 | 9/1996 |
| EP | 1 117 202 A2 | 7/2001 |
| WO | WO9914885 | 3/1999 |
| WO | WO0124465 | 4/2001 |
| WO | WO0152467 | 7/2001 |

* cited by examiner

APPARATUS AND METHOD FOR RECEIVING PACKET DATA CONTROL CHANNEL IN A MOBILE COMMUNICATION SYSTEM

PRIORITY

This application claims priority under 35 U.S.C. §119 to an application entitled "Apparatus and Method for Receiving Packet Data Control Channel in a Mobile Communication System" filed in the Korean Industrial Property Office assigned Serial Nos. 2002-16858 filed on Mar. 27, 2002 and 2002-61590 filed on Oct. 9, 2002, the contents of which both are incorporated herein by reference.

BACKGROUND OF THE INVENTION

1. Field of the Invention

The present invention relates to an apparatus and method for a mobile communication system supporting a multimedia service including voice and packet data services, and in particular, to an apparatus and method for effectively receiving a control channel that transmits packet data control information related to transmission of packet data.

2. Description of the Related Art

A conventional mobile communication system, for example, an Interim Standard-2000 (IS-2000), Code Division Multiple Access (CDMA) mobile communication system, chiefly supports a voice service and a low-speed circuit and packet data service. With the development of a communication technology and at the request of users, research has been conducted on a mobile communication system supporting a high-speed packet data service. In particular, an IS-2000 Evolution in Data and Voice (1×EVDV) mobile communication system, has recently attracted public attention, supports not only a voice service but also a high-speed packet data service. In order to realize a mobile communication system capable of supporting a high-speed packet data service as well as a voice service, a receiver capable of handling high-speed packet data is required.

In the 1×EVDV system, several users share the same packet data channel (PDCH) by time division multiplexing (TDM) in order to increase the transmission efficiency of packet data. In such a system, a transmitter transmits various control information for the packet data channel over a packet data control channel (PDCCH) for the same time period. The control information includes destination address, data rate, modulation scheme and code rate of transmission data, and is used for reception of a packet data channel.

A packet data channel and a packet data control channel both support a plurality of data rates. The data rates are related to a period, or the number of time slots, required for transmitting data having a predetermined length. For example, a length of control information transmitted over a packet data control channel is fixed to 13 bits, and the control information is transmitted over 1, 2 or 4 time slots each having a predetermined length. Although a data rate of a packet data channel can be determined by a data rate of a packet data control channel, a transmitter does not separately inform a receiver of a data rate of the packet data control channel. The receiver detects a data rate of received data from the received data, and acquires control information according to the detected data rate.

As stated above, since a packet data control channel and a packet data channel are simultaneously transmitted in a pair, data transmitted over the packet data channel must be buffered until demodulation on the packet data control channel is completed. Therefore, as demodulation on the packet data control channel is completed earlier, a demodulation start time for the packet data channel is advanced, contributing to rapid demodulation of packet data. That is, in a system that simultaneously transmits a packet data channel and a packet data control channel, demodulation on the packet data control channel must be rapidly performed in order to reduce time delay up to a demodulation start time for the corresponding packet data channel. Accordingly, there is a need for a method for rapidly and accurately demodulating a packet data control channel, especially for a high-speed packet data service.

SUMMARY OF THE INVENTION

It is, therefore, an object of the present invention to provide an apparatus and method for effectively receiving a control channel in a mobile communication system that simultaneously transmits a channel for transmitting packet data and the control channel for transmitting control information of the packet data.

It is another object of the present invention to provide an apparatus and method for detecting a rate of data received at a Viterbi decoder that is used for receiving a packet data control channel.

It is further another object of the present invention to provide an apparatus and method for selecting a data rate for received data from a plurality of cyclic redundancy code (CRC) check-passed candidate rates depending on a difference between metric values output from a Viterbi decoder that is used for receiving a packet data control channel.

To achieve the above and other objects, there is provided an apparatus for receiving control information transmitted from a transmitter using one of a plurality of slot lengths in a high-speed packet transmission mobile communication system. The apparatus comprises a decoder adapted to receive symbols by the slot, and generate at least one bit stream by decoding as many symbols of at least one possible slot length among a plurality of slot lengths according to a previous decoding result; an error checker adapted to perform error checking on the bit stream from the decoder; and a controller adapted to provide symbols of one more consecutive slot to the decoder, if the error checking failed, and acquire control information from the error checking-passed bit stream, if the error check passed.

To achieve the above and other objects, there is provided a method for receiving control information transmitted from a transmitter using one of a plurality of slot lengths in a high-speed packet transmission mobile communication system. The method comprises the steps of generating at least one bit stream by decoding as many symbols of at least one possible slot length among the slot lengths according to a previous decoding result by a decoder that receives symbols by the slot; performing error checking on the bit stream; acquiring control information from the error checking-passed bit stream, if the error checking passed; and providing symbols of one more consecutive slot to the decoder if the error checking failed and repeating the above steps until the error checking passes.

To achieve the above and other objects, there is provided a method for receiving control information transmitted from a transmitter over code-division-multiplexed first and second control channels using one of a plurality of slot lengths in a high-speed packet transmission mobile communication system. The method comprise the steps of generating at least one first bit stream by decoding as many symbols of at least one possible slot length among a plurality of slot lengths according to a previous decoding result by a first decoder that receives symbols by the slot over the first control channel; performing error checking on the first bit stream; providing symbols of one more consecutive slot to the first decoder until the error checking is passes, if the error checking on the first bit stream failed, and repeating the above steps to detect a slot length used for the first slot channel; acquiring first control information with a first user identifier from the first bit stream corresponding to the detected slot length; decoding as many symbols as the detected slot length to generate a second bit stream by a second decoder that receives symbols by the slot over the second control channel if the first user identifier is not identical to its own user identifier; performing error checking on the second bit stream; and acquiring second control information with a second user identifier from the second bit stream, if the error checking on the second bit stream passed.

To achieve the above and other objects, there is provided an apparatus for receiving control information transmitted from a transmitter using one of a plurality of slot lengths in a high-speed packet transmission mobile communication system. The apparatus comprises a decoder adapted to receive symbols by the slot, and generate a plurality of bit streams and frame quality metrics for the bit streams by decoding as many symbols as each of the slot lengths an error checker for performing error checking on the bit streams; and a controller adapted to compare frame quality metrics for the error checking-passed bit streams with each other if error checking on at least 2 bit streams passed, select one bit stream having the maximum frame quality metric, and acquire control information from the selected bit stream.

To achieve the above and other objects, there is provided a method for receiving control information transmitted from a transmitter using one of a plurality of slot lengths in a high-speed packet transmission mobile communication system, the method comprises the steps of generating a plurality of bit streams and frame quality metrics for the bit streams by decoding as many symbols as each of the slot lengths by a decoder that receives symbols by the slot; performing error checking on the bit streams; and comparing frame quality metrics for the error checking-passed bit streams with each other, if error checking on at least 2 bit streams passed, selecting one bit stream having the maximum frame quality metric, and acquiring control information from the selected bit stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
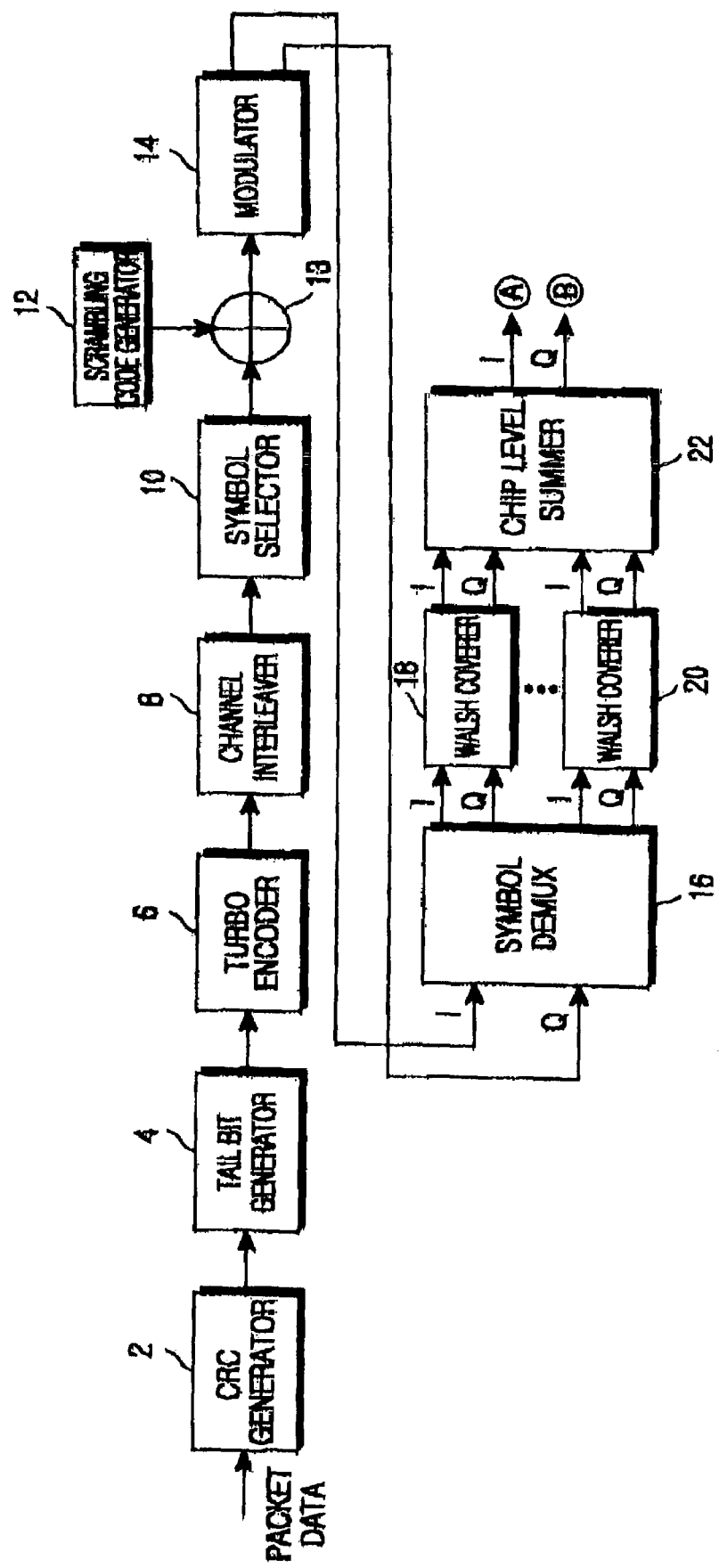
FIG. 1 is a block diagram illustrating an example of a structure of a forward packet data channel (F-PDCH) transmitter according to an embodiment of the present invention.

Several embodiments of the present invention will now be described in detail with reference to the accompanying drawings. In the drawings, the same or similar elements are denoted by the same reference numerals. Also, a detailed description of known functions and configurations have been omitted for conciseness.

The present invention provides herein a receiver structure for efficiently demodulating a packet data control channel (PDCCH) that transmits various control information necessary for the demodulation of a packet data channel (PDCH) in a mobile communication system which is capable of supporting a multimedia service including a voice service and a low-speed circuit and high-speed packet data service, using a 1× bandwidth. In addition, the present invention provides a receiver structure for efficiently receiving a plurality of packet data control channels which are multiplexed by code division multiplexing (CDM).

In the following description, specific details such as a length and a unique number of a Walsh code used for the spreading of a forward packet data control channel, a type and the number of bits of information transmitted over the packet data control channel, and a repetition number of an input sequence will be provided for better understanding of the present invention. It would be obvious to those skilled in the art that the invention can be easily implemented without the specific details or through modification of the same. In addition, the term "forward link" as used herein refers to a link transmitted from a base station of a known cellular communication system to a mobile station, and the term "reverse link" refers to a link transmitted from a mobile station to a base station.

A description will now be made of the channels used in the present invention.

Channels for a forward link packet data service are divided into a common channel, a control channel and a traffic channel. The common channel typically represents a pilot channel (PICH), and is used to provide a reference amplitude and a phase variation necessary for synchronous demodulation at a mobile station. The traffic channel includes a packet data channel (PDCH) that actually carries forward packet data, and the control channel includes two separated channels that transmit control information related to the packet data channel.

A first control channel, known as a primary packet data control channel (PPDCCH), transmits, to a mobile station, subpacket length information indicating the number of slots constituting forward packet data. A second control channel, known as a secondary packet data control channel (SPDCCH) transmits, to a mobile station, (i) a medium access control identifier (MAC_ID) as a user identifier indicating a destination mobile station of a forward transmission packet, (ii) a subpacket identifier (SP_ID) indicating whether a transmission packet is a new packet or a retransmitted packet, (iii) an automatic repeat request (ARQ) channel identifier (ARQ_ID) indicating an ARQ channel corresponding to a transmission packet among a plurality of ARQ channels when parallel transmission is used, (iv) an encoder packet (EP) size indicating a size of a transmission packet, and (v) a Walsh space indicator indicating Walsh codes used for a packet data channel. Additionally, when CDM is used, the secondary packet data control channel may carry additional information for supporting CDM.

Since a forward packet data channel (F-PDCH) is simultaneously received at all mobile stations, each mobile station must distinguish a packet uniquely assigned to its user for accurate packet reception. Since user information and control information for a packet transmitted over F-PDCH are separately transmitted over two control channels, packet data transmitted over F-PDCH cannot be restored until demodulation on the two control channels is completed. Actually, however, demodulation on the F-PDCH can be performed after demodulation on the F-SPDCCH out of the two control channels is completed. This is a result of the length information of a packet transmitted over F-PPDCCH can be spontaneously determined by demodulating F-SPDCCH. In an embodiment of the present invention, data received on F-PDCH is temporarily stored until demodulation on F-SPDCCH is completed. A mobile station cannot determine (i) whether data received on F-PDCH is data assigned thereto, (ii) a size of a received packet, (iii) a modulation scheme, (iv) whether a received packet is a retransmitted packet, and (v) Walsh code numbers in use, until demodulation on the F-SPDCCH is completed.

In addition, when CDM is used, there may simultaneously exist a plurality of F-SPDCCHs. Actually, even though CDM is used, the maximum number of available SPDCCHs is limited to 2 due to limitations on performance. In the case of a system that transmits packet data to a plurality of users by CDM, since a base station transmits control information for F-PDCH of each user over as many independent F-SPDCCHs as the number of users, a mobile station must detect only a particular F-SPDCCH including control information indicating transmission of packet data thereto from the F-SPDCCHs, and then demodulate the F-SPDCCH.

The present invention provides a receiver and reception method for effectively demodulating a forward packet data control channel (F-PDCCH) that transmits control information necessary for demodulation of a packet data channel (PDCH), in a system that uses CDM in order to simultaneously support a packet data service to a plurality of users in addition to time division multiplexing (TDM) fundamentally used in F-PDCH for packet data transmission. For this, a description will first be made of a packet data channel transmitter and a secondary packet data control channel transmitter, both included in a base station. Next, a description will be made of a structure and procedure for receiving, in a mobile station, signals transmitted from the packet data channel transmitter and the secondary packet data control channel transmitter, and then demodulating the received signals.

FIG. 1 is a block diagram illustrating an example of a structure of a packet data channel (PDCH) transmitter according to an embodiment of the present invention. Referring to FIG. 1, a cyclic redundancy code (CRC) generator 2 generates a CRC for input packet data having a predetermined number of bits, and attaches the generated CRC to the input packet data. For example, the CRC has 8 bits. A tail bit generator 4 attaches tail bits e.g., 8 zero-bits for convergence during decoding, to the CRC-attached packet data from the CRC generator 2. An encoder 6 encodes a bit stream from the tail bit generator 4 and generates code symbols or coded symbols. Herein, the encoder 6 represents a turbo encoder that turbo-encodes an input bit stream and generates a predetermined number of code symbols according to a code rate R. For example, if a code rate of ⅕ is used, the encoder 6 generates 5 code symbols X, Y0, Y0', Y1 and Y1' for 1 input bit.

A channel interleaver 8 interleaves the code symbols from the encoder 6. A symbol selector 10 selects (or repeatedly selects) a predetermined number of symbols among the interleaved symbols from the channel interleaver 8. The symbols generated from the symbol selector 10 become a quasi complementary turbo code (QCTC).

A scrambling code generator 12 generates a scrambling sequence for scrambling symbols transmitted over a forward packet data channel. An exclusive OR (XOR) operator 13 performs a logical XOR operation on the symbols from the symbol selector 10 and the scrambling sequence from the scrambling code generator 12, and generates scrambled symbols. A modulator 14 modulates the scrambled symbols from the XOR operator 13, and generates complex modulation symbols or modulated symbols for an in-phase (I) channel and a quadrature-phase (Q) channel.

Figure 3:
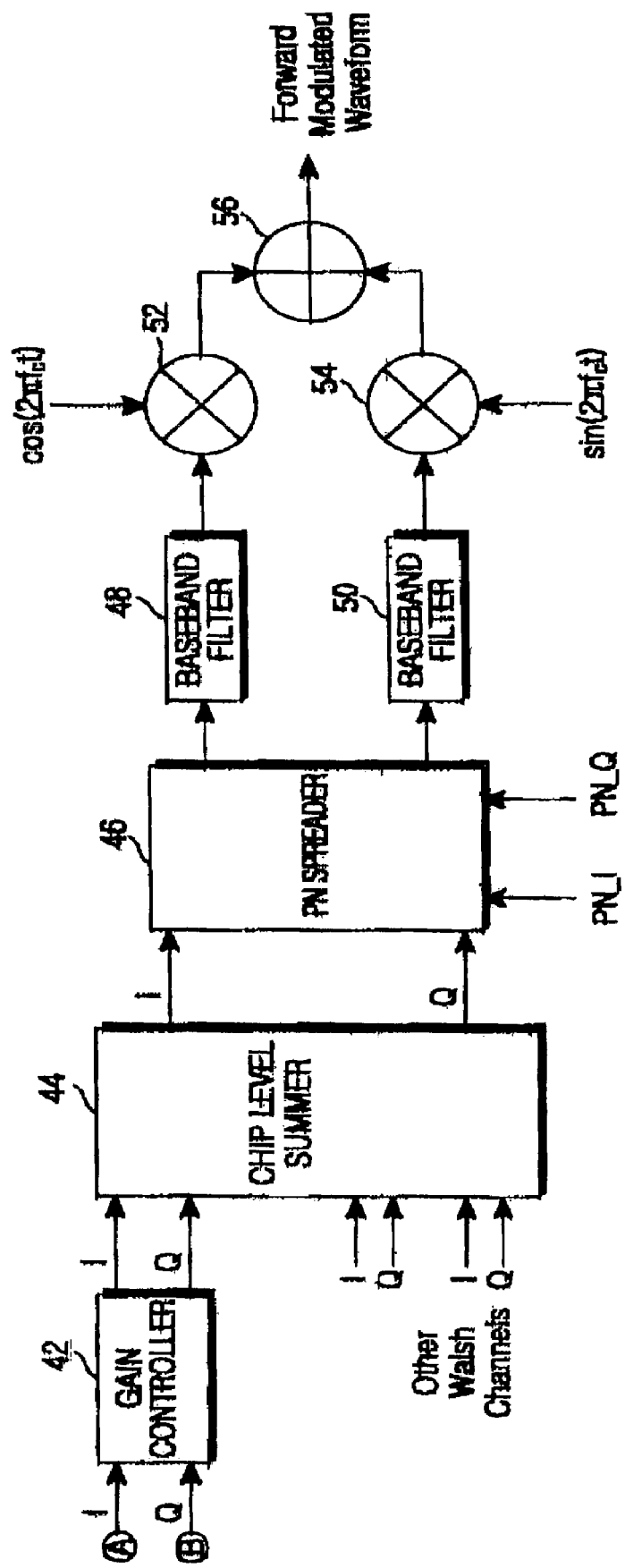
FIG. 3 is a block diagram illustrating an example of a structure for transmitting channel signals generated by the transmitters of FIGS. 1 and 2 in a base station according to an embodiment of the present invention.

A symbol demultiplexer (DEMUX) 16 demultiplexes the modulation symbols from the modulator 14 into preferably as many modulation symbols as the number of Walsh codes currently available for a packet data channel (PDCH), and then outputs the demultiplexed modulation symbols over a plurality of I channels and Q channels. A plurality of Walsh coverers 18 and 20 each receive symbols on a corresponding I channel and Q channel from the symbol demultiplexer 16, and spread the received symbols with a corresponding Walsh code among the Walsh codes available for PDCH. A Walsh chip level summer 22 chip-level-sums outputs of the Walsh coverers 18 and 20 according to I and Q channels, and generates its outputs over an I channel and a Q channel. The I channel and the Q channel of the Walsh chip level summer 22 are applied to terminals A and B of FIG. 3, respectively. In FIG. 3, the I channel and the Q channel are converted into a radio frequency (RF) band through pseudo-random noise (PN) spreading and baseband filtering, and then transmitted through an antenna.

Figure 2:
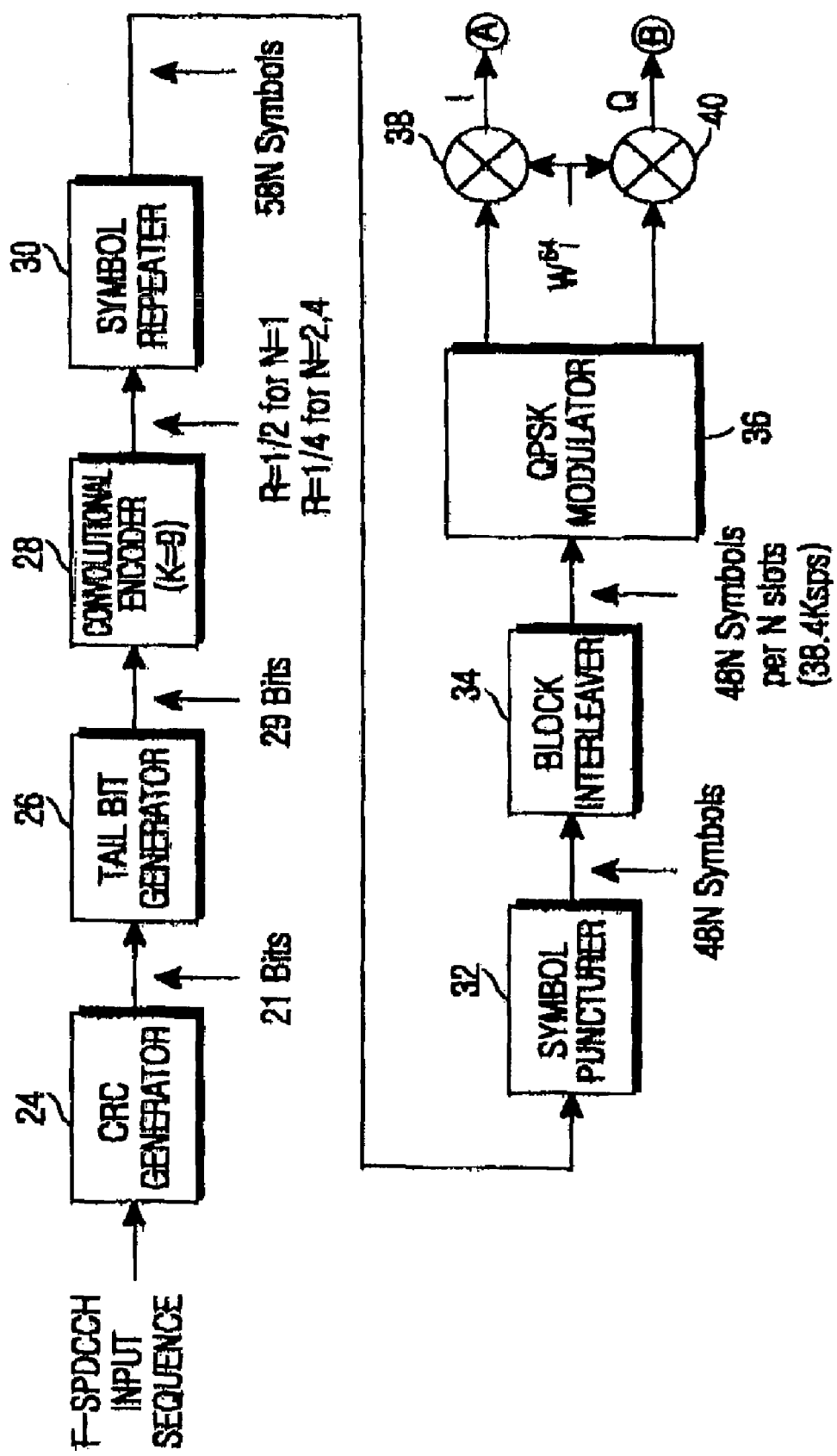
FIG. 2 is a block diagram illustrating an example of a structure of a forward secondary packet data control channel (F-SPDCCH) transmitter according to an embodiment of the present invention.

FIG. 2 is a block diagram illustrating an example of a structure of a secondary packet data control channel (SPDCCH) transmitter according to an embodiment of the present invention. Referring to FIG. 2, a CRC generator 24 generates a CRC for an input sequence representing control information necessary for demodulation of a packet data channel, and attaches the generated CRC to the input sequence. For example, the CRC has 8 bits. A tail bit generator 26 attaches 8 tail bits e.g., 8 zero-bits for convergence during decoding, to the CRC-attached input sequence from the CRC generator 24, and outputs a 29-bit stream.

A convolutional encoder 28 convolutional-encodes the tail-attached bit stream from the tail bit generator 26, and generates code symbols. Herein, a constraint length K of the convolutional encoder 28 is preferably 9. A code rate of the convolutional encoder 28 is determined by a data rate, i.e., the number N of slots, of SPDCCH. That is, for N=1, the convolutional encoder 28 generates 2 code symbols for each input bit according to a code rate R=½, and for N=2 or 4, the convolutional encoder 28 generates 4 code symbols for each input bit according to a code rate R=¼.

A symbol repeater 30 repeats the code symbols from the convolutional encoder 28 a predetermined number of times according to a data rate of the SPDCCH. In particular, for N=4, the symbol repeater 30 repeats input symbols two times. A symbol puncturer 32 punctures a predetermined number of symbols from the repeated symbols provided from the symbol repeater 30. An interleaver 34 interleaves the punctured symbols from the symbol puncturer 32. A block interleaver is used herein as the interleaver 34. As a result, the block interleaver 34 outputs 48N symbols every N slots.

A modulator 36 Quadrature Phase Shift Keying (QPSK) modulates the interleaved symbols provided from the interleaver 34, and generates modulation symbols of I and Q channels. Multipliers 38 and 40 each spread the modulation symbols from the modulator 36 with a Walsh code of length 64, assigned to F-SPDCCH. Outputs of the multipliers 38 and 40 are applied to the terminals A and B of FIG. 3, respectively. In FIG. 3, the outputs of the multipliers 38 and 40 are converted into an RF band through PN spreading and baseband filtering, and then transmitted through an antenna.

A channel signal generated from the secondary packet data control channel (F-SPDCCH) transmitter of FIG. 2 is CDM-multiplexed with other channel signals such as a primary packet data control channel (F-PPDCCH) signal, a packet data channel (F-PDCH) signal and a pilot channel (PICH) signal before being transmitted.

As mentioned above, control information transmitted over a secondary packet data control channel comprises(i) 6-bit MAC_ID indicating a user scheduled to receive packet data, (ii) 2-bit SP_ID indicating whether a transmission packet is a retransmitted packet, (iii) 2-bit ARQ_ID indicating an ARQ channel of packet data, and (iv) 3-bit EP_SIZE indicating a size of an encoder packet (EP). When CDM is used, the control information further includes corresponding additional information such as Walsh space indicator and CDM channel indicator.

A mobile station acquires the above-stated information based on the control information received over the secondary packet data control channel (F-SPDCCH), and uses the acquired information for demodulation of a packet data channel. A value of a length N of slots occupied by the control information transmitted over the secondary packet data control channel (F-SPDCCH) is determined according to a packet length of F-PDCH transmitted. For example, N=1 for SUBPACKET_LENGTH=1, N=2 for SUBPACKET_LENGTH=2, and N=4 for SUBPACKET_LENGTH=4 or 8.

FIG. 3 is a block diagram illustrating an example of a structure for transmitting channel signals generated by the transmitters of FIGS. 1 and 2 in a base station according to an embodiment of the present invention. Referring to FIG. 3, a gain controller 42 multiplies I channel and Q channel signals from, for example, PDCH, PPDCCH and SPDCCH transmitters by a corresponding gain. A chip level summer 44 chip-level-sums the gain-controlled complex channel signals according to I and Q channels, and generates an output through an I channel and a Q channel. A PN spreader 46 multiplies the I channel and Q channel signals from the chip level summer 44 by PN codes PN_I and PN_Q for the complex channels. Baseband filters 48 and 50 each baseband-filters the PN-spread signals received from the PN spreader 46. Multipliers 52 and 54 each convert their corresponding baseband-filtered signals into corresponding carrier bands fc.

An adder 56 generates a forward modulated waveform by adding outputs of the multipliers 52 and 54, and then transmits the generated forward modulated waveform to an antenna (not shown).

Figure 4:
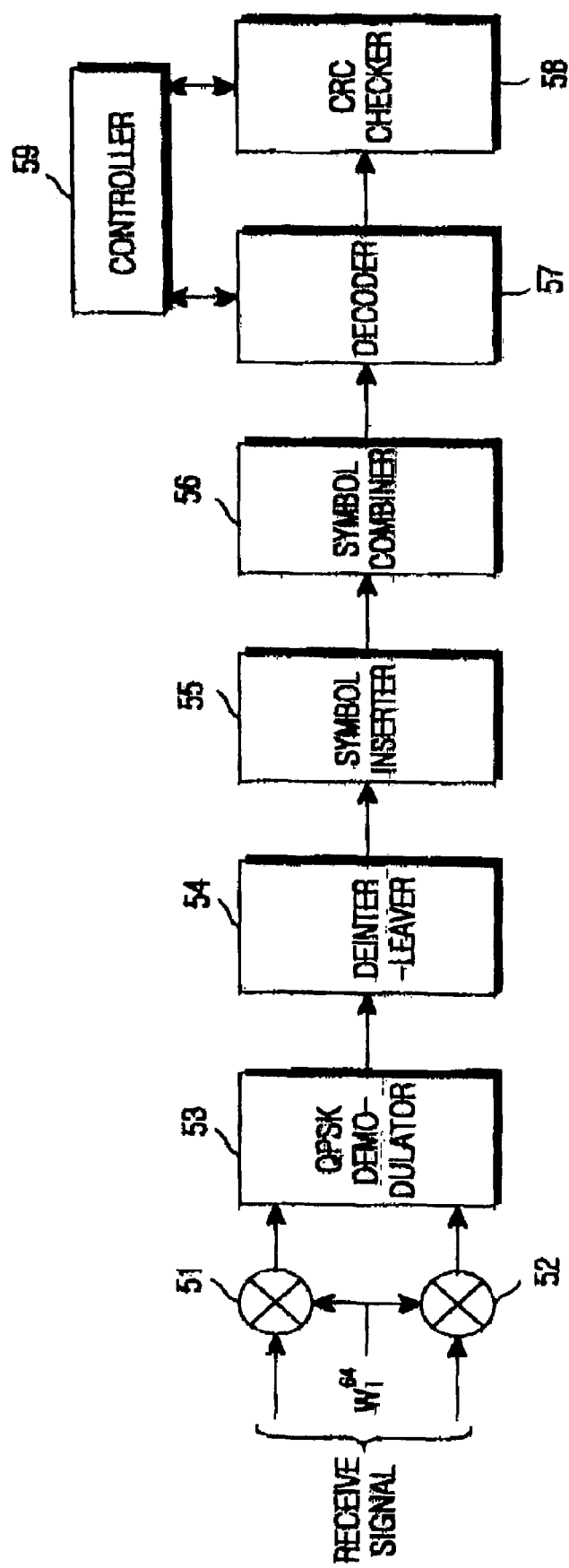
FIG. 4 is a block diagram illustrating an example of a structure of a forward secondary packet data control channel (F-SPDCCH) receiver according to an embodiment of the present invention.

FIG. 4 is a block diagram illustrating an example of a structure of a secondary packet data control channel (F-SPDCCH) receiver according to an embodiment of the present invention. The receiver of FIG. 4 corresponds to the transmitter of FIG. 2.

Referring to FIG. 4, multipliers 51 and 52 despread received signals preferably with a Walsh code $W_i^{64}$ assigned to the secondary packet data control channel. A QPSK demodulator 53 QPSK-demodulates outputs of the multipliers 51 and 52, and generates demodulation symbols or demodulated symbols. A deinterleaver 54 deinterleaves the demodulation symbols from the QPSK demodulator 53 according to a predetermined deinterleaving rule. A symbol inserter 55 inserts zero-symbols into the deinterleaved symbols from the deinterleaver 54 according to a predetermined insertion rule. A symbol combiner 56 combines the symbols provided from the symbol inserter 55 according to a predetermined combining rule.

A decoder 57, under the control of a controller 59, decodes the symbols of consecutive slots provided from the symbol combiner 56 and generates a bit stream representing control information MAC_ID, SP_ID, ARQ_ID, EP_SIZE, and so on of the secondary packet data control channel. The bit stream is divided into information bits and CRC bits. A CRC checker 58 performs a CRC check on the information bits generated from the decoder 57, and provides the CRC check result to the controller 59.

In brief, the controller 59 controls a decoding period of the decoder 57, and determines whether a secondary packet data control channel is acquired or not, based on the CRC check result of the CRC checker 58. If the CRC check passed for example, CRC OK, the controller 59 provides a packet data channel (PDCH) receiver with information bits except the CRC bits so that the PDCH receiver can use the information bits for the demodulation of packet data. A control operation of the controller 59 will be described in detail later.

As mentioned above, a secondary packet data control channel (SPDCCH) supports a plurality of data rates. Therefore, the controller 59 must detect a data rate and a slot length, used during transmission of control information, from the data decoded by the decoder 57. A decision method of detecting a data rate from received data is classified into a pre-decision method and a post-decision method. The pre-decision method detects a data rate before decoding of a frame, and then performs decoding according to the detected data rate, and the post-decision method detects a data rate after decoding of a frame, and then acquires a decoding result data corresponding to the detected data rate. In particular, the post-decision method generally performs decoding on all possible data rates, and then determines a data rate based on the decoding results. Typically, an error check result based on CRC bits included in received data serves as a criterion for determining a data rate.

Since SPDCCH uses 1, 2 or 4 slots according to a slot length of PDCH, the post-decision method preferably performs, in principle, decoding on possible slot lengths of the SPDCCH each time symbols of every slot are received. Performing decoding on all possible slot lengths every slot even though possible slot lengths of the SPDCCH are predetermined is very inefficient and causes an increase in delay before reception of a packet data channel.

Therefore, the present invention can detect an accurate slot length by performing decoding as many times as an actually needed number according to decoding results at a previous slot, instead of performing decoding on all possible slot lengths of SPDCCH every slot in order to demodulate SPD-CCH. Now, an operation of detecting a data rate, or a slot length, of SPDCCH according to the present invention will be described in detail with reference to the accompanying drawings, and for the sake of convenience, an operation of the decoder 57 will first be described. In addition, a description will be separately made of one case where one SPDCCH is used and another case where a plurality of CDM-multiplexed SPDCCHs are used.

Figure 5:
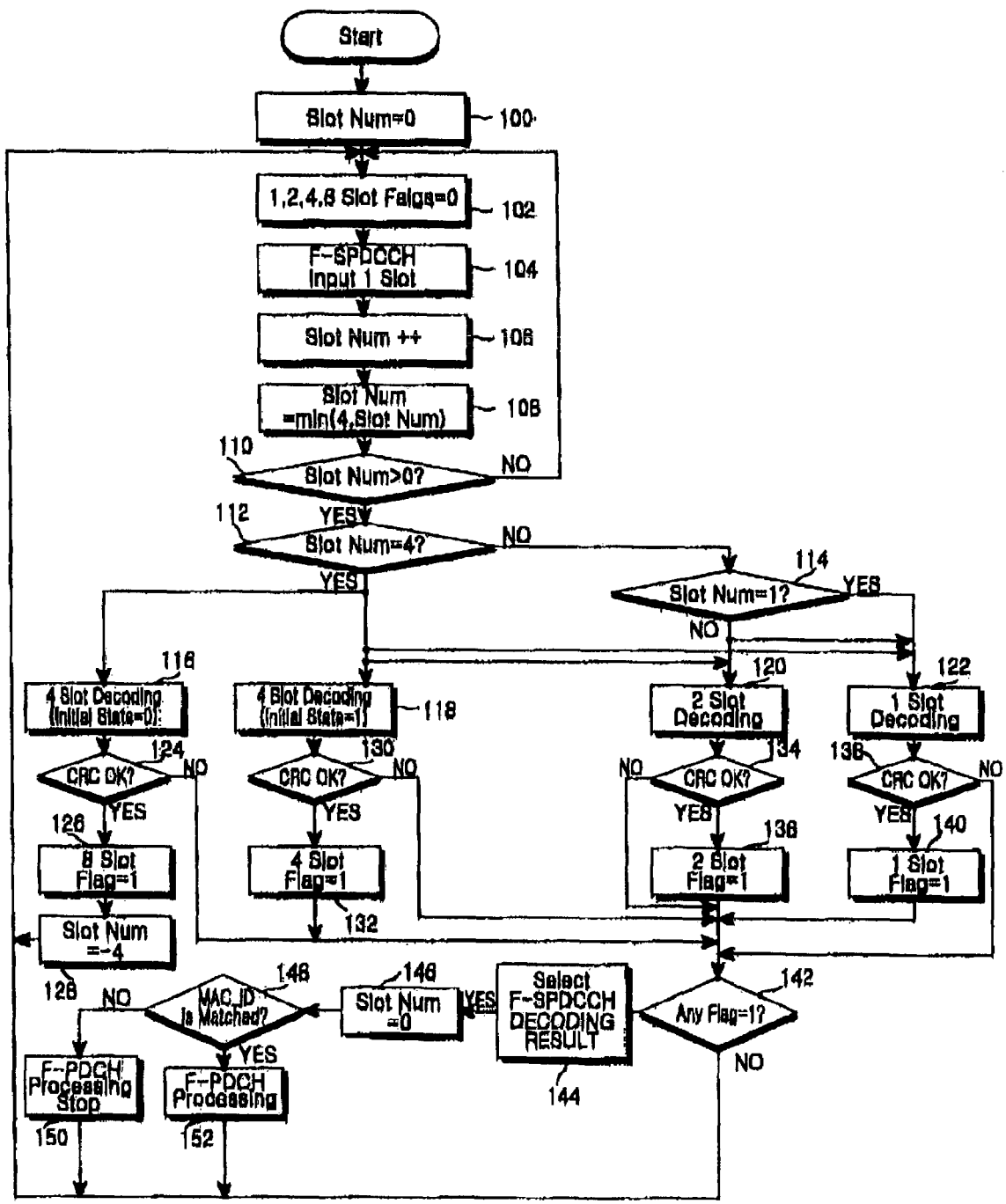
FIG. 5 is a flow chart illustrating an example of steps for receiving a secondary packet data control channel (SPD-CCH) in a mobile station according to an embodiment of the present invention, wherein one SPDCCH is used.

FIG. 5 is a flow chart illustrating an example of steps for receiving a secondary packet data control channel (SPDCCH) in a mobile station according to an embodiment of the present invention, wherein one SPDCCH is used. This procedure is assumed to be performed by the controller 59 of FIG. 4.

Referring to FIG. 5, the controller 59 initializes a slot number to '0' in step 100 (Slot_Num=0), and initializes all of 4 slot flags for example, 1-slot flag, 2-slot flag, 4-slot flag, and 8-slot flag for checking all possible slot lengths of SPDCCH to '0' in step 102. The 1-slot flag, 2-slot flag and 4-slot flag are provided to detect when SPDCCH uses 1, 2 and 4 slots, respectively. In particular, the 8-slot flag is provided to detect when SPDCCH uses 4 slots and PDCH uses 8 slots. The controller 59 receives symbols of one slot over SPDCCH in step 104, and increases the slot number by '1' in step 106. The above-stated symbols represent the symbols that were previously received and stored in a buffer arranged in a previous stage of the decoder after being subject to Walsh despreading and symbol combining. The controller 59 stores a smaller value out of the increased slot number and a slot number '4' as a new slot number in step 108, and then proceeds to step 110 because the SPDCCH does not use more than 4 slots.

If the slot number is '4' (Slot_Num=4), decoding of SPDCCH is not successful until 4 slots are received. Here, "success in decoding" means that the CRC check on the decoding result is successful or has passed. If decoding is not successful even after 4 slots are received, the slot number becomes 4 as before, even though symbols of an additional slot are received and decoded. Therefore, in an embodiment of the present invention, decoding is performed on preferably only 4 slots. However, when 5 or more slots are received, decoding is performed on symbols of the last received 4 slots.

The controller 59 determines in step 110 whether the slot number is larger than '0' (Slot_Num>0). If the slot number is smaller than or equal to '0', the controller 59 returns to step 102. However, if the slot number is larger than '0', the controller 59 determines in step 112 whether the slot number is '4' (Slot_Num=4). If decoding is successful at the slot number '4', the controller 59 is allowed not to perform decoding on F-SPDCCH until a new F-PDCH is received. If the slot number is 4, the controller 59 proceeds to steps 116, 118, 120 and 122, and controls (orders) the decoder 57 to perform decoding on symbols of the last received 4, 4, 2 and 1 slots, respectively. The 4 decoding operations can be performed either sequentially by a common decoder, or in parallel by 4 separate decoders having the same structure.

Since Slot_Num=4 means that symbols of 4 slots have been received after successful decoding, it is possible to perform decoding on symbols of the last received 1, 2 and 4 slots. Since the successfully decoded symbols are deleted after being used for processing of F-PDCH, symbols received after successful decoding refer to the last received symbols. Decoding is performed twice on symbols of the 4 slots because if F-SPDCCH uses 4 slots, F-PDCH uses any one of a 4-slot length and an 8-slot length. This can be distinguished by setting an initial state of the decoder 57 to '0' (step 116) or '1' (step 118) when performing decoding on 4 slots. The initial state '0' is set to detect when F-PDCH uses 8 slots, and the initial state '1' is set to detect when F-PDCH uses 4 slots.

If, however, the slot number is not '4', the controller 59 determines in step 114 whether the slot number is '1' (Slot_Num=1). If the slot number is '1', the controller 59 controls in step 122 the decoder 57 to decode symbols of one slot received after successful decoding. Otherwise, if the slot number is not '1', it means that the slot number is 2 or 3, so the controller 59 controls in step 120 the decoder 57 to decode symbols of the last received 2 slots and 1 slot. If the slot number is '2', it means that symbols of 2 slots have been received after being successfully decoded, so it is possible to perform decoding on symbols of the last received 1 slot and 2 slots. Likewise, if the slot number is '3', it means that symbols of 3 slots have been received after success in decoding, so it is possible to perform decoding on symbols of the last received 1 slot and 2 slots. That is, since SPDCCH does not use 3 slots, decoding is performed in the same way when the slot number is '3' and the slot number is '2'.

In step 124, the controller 59 performs a CRC check on 8 slots using an information bit stream obtained by performing decoding in step 116. If the CRC check passed for example, CRC OK, the controller 59 sets the 8-slot flag to '1' in step 126, and sets the slot number to '−4' in step 128, and then returns to step 102. However, if the CRC check failed, the controller 59 proceeds to step 142. Here, setting the 8-slot flag to '1' means that a subpacket length (SP_LEN) of a packet data channel is determined as 8 slots, since decoding on 4 slots with an initial state '0' is successful. Therefore, the slot number is set to '−4' in order to disregard 4 F-SPDCCH slots received from now on. In step 130, the controller 59 performs a CRC check on 4 slots using an information bit stream obtained by performing decoding in step 118. If the CRC check passed, the controller 59 sets the 4-slot flag to '1' in step 132, and then proceeds to step 142. Otherwise, if the CRC check failed, the controller 59 proceeds directly to step 142.

In step 134, the controller 59 performs a CRC check on 2 slots using an information bit stream obtained by performing decoding in step 120. If the CRC check passed, the controller 59 sets the 2-slot flag is set to '1' in step 136, and then proceeds to step 142. If, however, the CRC check failed, the controller 59 proceeds directly to step 142. Further, in step 138, the controller 59 performs a CRC check on 1 slot using an information bit stream obtained by performing decoding in step 122. If the CRC check passed, the controller 59 sets the 1-slot flag to '1' in step 140, and then proceeds to step 142. If, however, the CRC check failed, the controller 59 proceeds directly to step 142.

In step 142, the controller 59 determines whether any one of the slot flags is set to '1'. If any one of the slot flags is set to '1', the controller 59 selects in step 144 one accurate decoding result including F-PDCH-related control information from at least one decoding result among the decoding results of the steps 116, 118, 120 and 122. The control information, as described above, includes MAC_ID, ARQ_ID, EP_SIZE, and SP_ID. Herein, a slot length corresponding to the selected decoding result is detected as a slot length, or a data rate, of the SPDCCH, used by a transmitter.

In an ideal case, since a CRC check on the decoding result based on a slot length used by a transmitter will pass and a CRC check on the decoding results based on the other slot lengths will fail, the controller 59 selects in step 144 one decoding result corresponding to only one slot flag set to '1' among the slot flags. Actually, however, due to unpredictable distortion or noise of a radio environment, CRC check on two or more slot lengths may pass. In this case, the controller 59 selects one preferable decoding result among the decoding results corresponding to two or more slot flags set to '1', using an auxiliary criterion other than the CRC check result. A more detailed description of the operation performed in step 144 will be made with reference to FIGS. 7 to 10.

After selecting an accurate decoding result, the controller 59 initializes the slot number to '0' in step 146 (Slot_Num=0), and compares, in step 148, MAC_ID included in control information obtained from the selected decoding result with its own MAC_ID assigned from a base station. If the two MAC_IDs are identical to each other, the controller 59 controls in step 152 an F-PDCH receiver to demodulate F-PDCH using control information obtained from the decoding result. However, if the two MAC_IDs are different from each other, the controller 59 controls in step 150 the F-PDCH receiver to suspend processing on F-PDCH.

If it is determined in step 142 that there is no flag set to '1', the controller 59 returns to step 102 because symbols of one more consecutive slot must be received, since decoding on symbols of F-SPDCCH, received up to the present, is not successful, i.e., acquiring control information has failed.

Hitherto, with reference to FIG. 5, a description has been made of an SPDCCH reception operation for the case where only one secondary packet data control channel (SPDCCH) is used. However, in the case where two or more CDM-multiplexed SPDCCHs are used, it is provided that two or more SPDCCHs should use the same slot length for the same time period. Therefore, if an accurate slot length of a first SPDCCH is detected, then decoding on the other SPDCCH is performed using only the detected slot length. Now, an operation of receiving two or more SPDCCHs will be described with reference to the accompanying drawings.

Figure 6A:
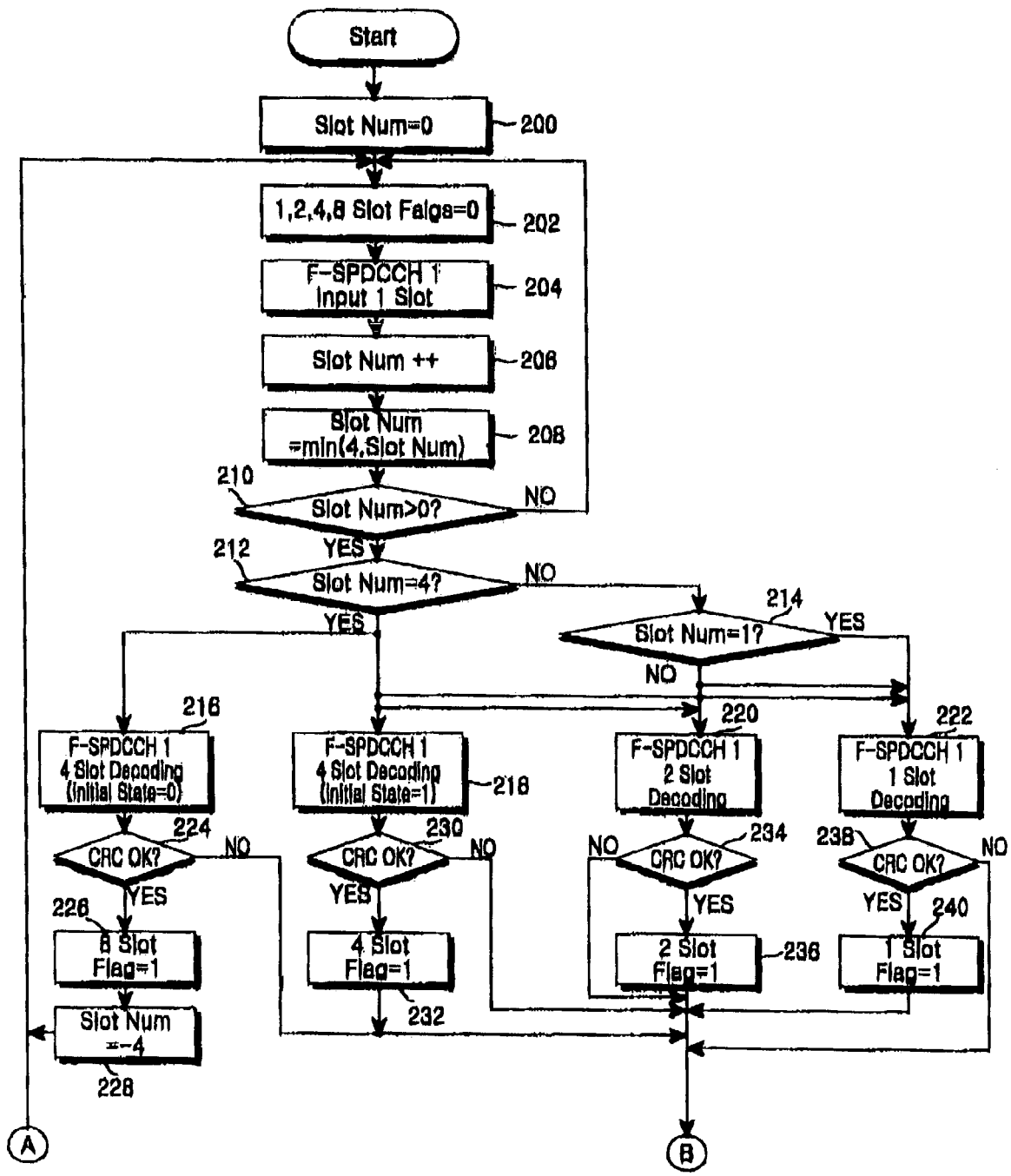
FIGS. 6A and 6B are flow charts illustrating an example of steps for receiving two secondary packet data control channels (SPDCCHs) in a mobile station according to an embodiment of the present invention.
Figure 6B:
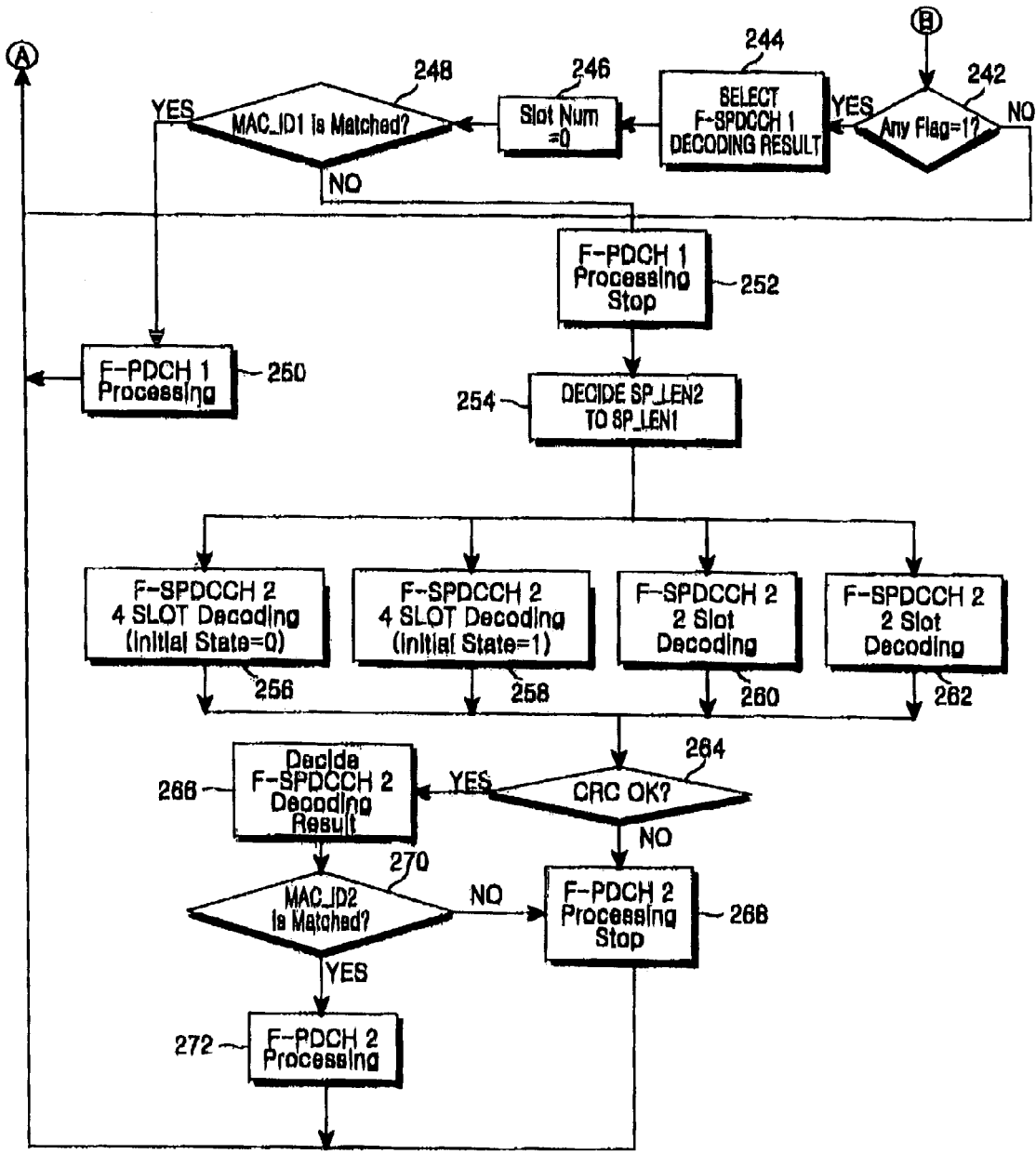

FIGS. 6A and 6B are flow charts illustrating an example of steps for receiving two or more secondary packet data control channels (SPDCCHs) in a mobile station according to an embodiment of the present invention. Specifically, FIG. 6A illustrates a procedure for receiving a first secondary packet data control channel (SPDCCH1) out of two secondary packet data control channels SPDCCH1 and SPDCCH2 transmitted by a base station by CDM, and FIG. 6B illustrates a procedure for receiving a second secondary packet data control channel (SPDCCH2). Those procedures are assumed to be performed by a controller 59 that controls the two packet data control channels.

Referring to FIG. 6A, the controller 59 initializes a slot number to '0' in step 200 (Slot_Num=0), and initializes all of 4 slot flags (1-slot flag, 2-slot flag, 4-slot flag, and 8-slot flag) for checking all possible slot lengths of SPDCCH to '0' in step 202. The controller 59 receives symbols of one slot over F-SPDCCH in step 204, and increases the slot number by '1' in step 206. The controller 59 stores a smaller value out of the increased slot number and a slot number '4' as a new slot number in step 208, and then proceeds to step 210. This is because the SPDCCH does not use more than 4 slots. Likewise, the above-stated symbols represent the symbols that were previously received and stored in a buffer arranged in a previous stage of a decoder after being subject to Walsh despreading and symbol combining.

The controller 59 determines in step 210 whether the slot number is larger than '0' (Slot_Num>0). If the slot number is smaller than or equal to '0', the controller 59 returns to step 202. However, if the slot number is larger than '0', the controller 59 determines in step 212 whether the slot number is '4' (Slot_Num=4). If decoding is successful at slot number '4', the controller 59 proceeds to steps 216, 218, 220 and 222, and controls (orders) the decoder to perform decoding on symbols of the last received 4, 4, 2 and 1 slots, respectively.

The 4 decoding operations can be performed either sequentially by a common decoder, or in parallel by 4 separate decoders having the same structure.

Since Slot_Num=4 means that symbols of 4 slots have been received after successful decoding, it is possible to perform decoding on symbols of the last received 1, 2 and 4 slots. For the symbols of the 4 slots, the controller 59 performs a decoding operation (step 216) where an initial state '0' is used to detect F-PDCH having an 8-slot length and a decoding operation (step 218) where an initial state '1' is used to detect F-PDCH having a 4-slot length.

If, however, the slot number is not '4', the controller 59 determines in step 214 whether the slot number is '1' (Slot_Num=1). If the slot number is '1', the controller 59 controls in step 222 the decoder to decode symbols of one slot received after successful decoding. Otherwise, if the slot number is not '1', it means that the slot number is 2 or 3, so the controller 59 proceeds to step 220 or 222, and controls the decoder to decode symbols of the last received 2 slots and 1 slot. If the slot number is '2', it means that symbols of 2 slots have been received after being successfully decoded, so it is possible to perform decoding on symbols of the last received 1 slot and 2 slots. Likewise, if the slot number is '3', it means that symbols of 3 slots have been received after being successfully decoded, so it is possible to perform decoding on symbols of the last received 1 slot and 2 slots because SPDCCH does not use 3 slots.

In step 224, the controller 59 performs CRC a check on 8 slots using an information bit stream obtained by performing decoding in step 216. If the CRC check passed for example, CRC OK, the controller 59 sets the 8-slot flag to '1' in step 226, and sets the slot number to '−4' in step 228, and then returns to step 202. However, if the CRC check failed, the controller 59 proceeds to step 242 of FIG. 6B. Here, setting the 8-slot flag to '1' means that a subpacket length (SP_LEN) of a packet data channel (PDCH) is determined as 8 slots, since decoding on 4 slots with an initial state '0' is successful. Therefore, the slot number is set to '−4' in order to disregard 4 F-SPDCCH slots received from now on. In step 230, the controller 59 performs a CRC check on 4 slots using an information bit stream obtained by performing decoding in step 218. If the CRC check passed, the controller 59 sets the 4-slot flag to '1' in step 232, and then proceeds to step 242. Otherwise, if the CRC check failed, the controller 59 directly proceeds to step 242.

In step 234, the controller 59 performs a CRC check on 2 slots using an information bit stream obtained by performing decoding in step 220. If the CRC check passed, the controller 59 sets the 2-slot flag to '1' in step 236, and then proceeds to step 242. If, however, the CRC check failed, the controller directly proceeds to step 242. Further, in step 238, the controller performs CRC check on 1 slot using an information bit stream obtained by performing decoding in step 222. If the CRC check passed, the controller sets the 1-slot flag to '1' in step 240, and then proceeds to step 242. If, however, the CRC check failed, the controller 59 directly proceeds to step 242.

Referring now to FIG. 6B, the controller 59 determines in step 242 whether any one of the slot flags is set to '1'. If any one of the slot flags is set to '1', the controller 59 selects in step 244 one accurate decoding result including F-PDCH-related control information from at least one decoding result among the decoding results of the steps 216, 218, 220 and 222. The control information includes MAC_ID1, ARQ_ID1, EP_SIZE1, and SP_ID1. Herein, a slot length corresponding to the selected decoding result is detected as a slot length, or a data rate, used by a transmitter for transmission of F-SPD- CCH. Likewise, when there exist two or more slot flags set to '1', the controller 59 selects one preferable decoding result, using an auxiliary metric other than the CRC check result, and its detailed description will be made later.

After selecting an accurate decoding result, the controller 59 resets the slot number to '0', in step 246 (Slot_Num=0), to prepare to receive new slots of F-SPDCCH. In step 248, the controller 59 compares MAC_ID1, user identification information of F-SPDCCH1, included in control information obtained from the selected decoding result with its own MAC_ID assigned from a base station. If the two MAC_IDs are identical to each other, the controller 59 controls in step 250 an F-PDCH receiver to demodulate a corresponding packet data channel F-PDCH1 using the control information. The F-PDCH1 refers to PDCH indicated by control information of F-SPDCCH1.

However, if the two MAC_IDs are different from each other, the controller 59 controls in step 252 the F-PDCH receiver to suspend processing on F-PDCH1, and then proceeds to step 254. In step 254, the controller 59 starts processing on F-SPDCCH2 according to a subpacket length (SP_LEN) of F-PDCH, acquired from the F-SPDCCH1. Meanwhile, if it is determined in step 242 that there is no flag set to '1', the controller 59 returns to step 202 because it is not necessary to decode F-SPDCCH2, since decoding on F-SPDCCH1 failed.

In step 254, the controller 59 determines a subpacket length SP_LEN2 of PDCH2, indicated by F-SPDCCH2, according to a subpacket length SP_LEN1 of PDCH 1, acquired by demodulating F-SPDCCH 1. If the subpacket length SP_LEN1 acquired from F-SPDCCH1 is 8 slots, the controller 59 controls in step 256 the decoder to decode symbols of 4 slots of F-SPDCCH2 by setting the initial state to '0', and an input to the decoder becomes symbols of the last 4 slots of F-SPDCCH2 received together with F-SPDCCH1. Next, if a subpacket length SP_LEN1 acquired from F-SPDCCH1 is '4', the controller 59 controls in step 258 the decoder to decode symbols of 4 slots of F-SPDCCH2 by setting the initial state to '1', and likewise, an input to the decoder becomes symbols of the last 4 slots of F-SPDCCH2 received together with F-SPDCCH1.

If a subpacket length SP_LEN1 acquired from F-SPDCCH1 is '2', the controller 59 controls in step 260 the decoder to decode symbols of 2 slots of F-SPDCCH2, and an input to the decoder becomes symbols of the last 2 slots of F-SPDCCH2 received together with F-SPDCCH1. Finally, if a subpacket length SP_LEN1 acquired from F-SPDCCH1 is '1', the controller 59 controls in step 262 the decoder to decode symbols of 1 slots of F-SPDCCH2, and an input to the decoder becomes symbols of the last 1 slot of F-SPDCCH2 received together with F-SPDCCH1.

In step 264, the controller 59 performs CRC check on one of the decoding results obtained in steps 256 to 262. If the CRC check failed, the controller 59 controls in step 268 an F-PDCH receiver to suspend processing on F-PDCH2 corresponding to F-SPDCCH2, and then returns to step 202 in order to continuously perform decoding on F-SPDCCH. Otherwise, if the CRC check passed, the controller 59 extracts, in step 266, control information necessary for demodulating a corresponding packet data channel F-PDCH2, from the decoding result of F-SPDCCH2. The control information includes MAC_ID2, ARQ_ID2, EP_SIZE2, and SP_ID2. Further, a slot length, or data rate, of F-SPDCCH2 is determined to be identical to the data rate of F-SPDCCH1.

In step 270, the controller 59 compares MAC_ID2 included in the control information with its own MAC_ID assigned from a base station. If the two MAC_IDs are identical to each other, the controller 59 controls in step 272 an F-PDCH receiver to perform processing on F-PDCH2 according to the control information. If, however, the two MAC_IDs are different from each other, the controller 59 controls in step 268 the F-PDCH receiver to suspend processing on F-PDCH2, and then returns to step 202. Herein, the F-SPDCCH1, F-SPDCCH2, F-PDCH1 and F-PDCH2 are simultaneously received, and in order to process first and second F-PDCHs according to the decoding results on first and second F-SPDCCHs, it is necessary to buffer the first and second F-PDCHs while processing the first and second F-SPDCCHs.

As mentioned above, in an ideal case, a CRC check on the decoding result based on an accurate data rate (i.e. slot length) passed, and a CRC check on the decoding results based on the other data rates failed. Therefore, in most cases, the data rate used in the transmitter can be determined based on only the CRC check results. Actually, however, due to unpredictable distortion or noise of a radio environment, a CRC check on two or more data rates may pass. In this case, another auxiliary metric for detecting an accurate data rate is required.

A symbol error rate (SER) is typically used as the auxiliary metric. The symbol error rate means a difference in the number of symbols based on the result obtained by re-encoding decoded data of a received frame and then comparing the re-encoded data with an original received frame by the symbol. If CRC check on a plurality of candidate rates passed, a receiver compares symbol error rates of the CRC check-passed data rates to detect a data rate having the least symbol error rate.

Figure 7:
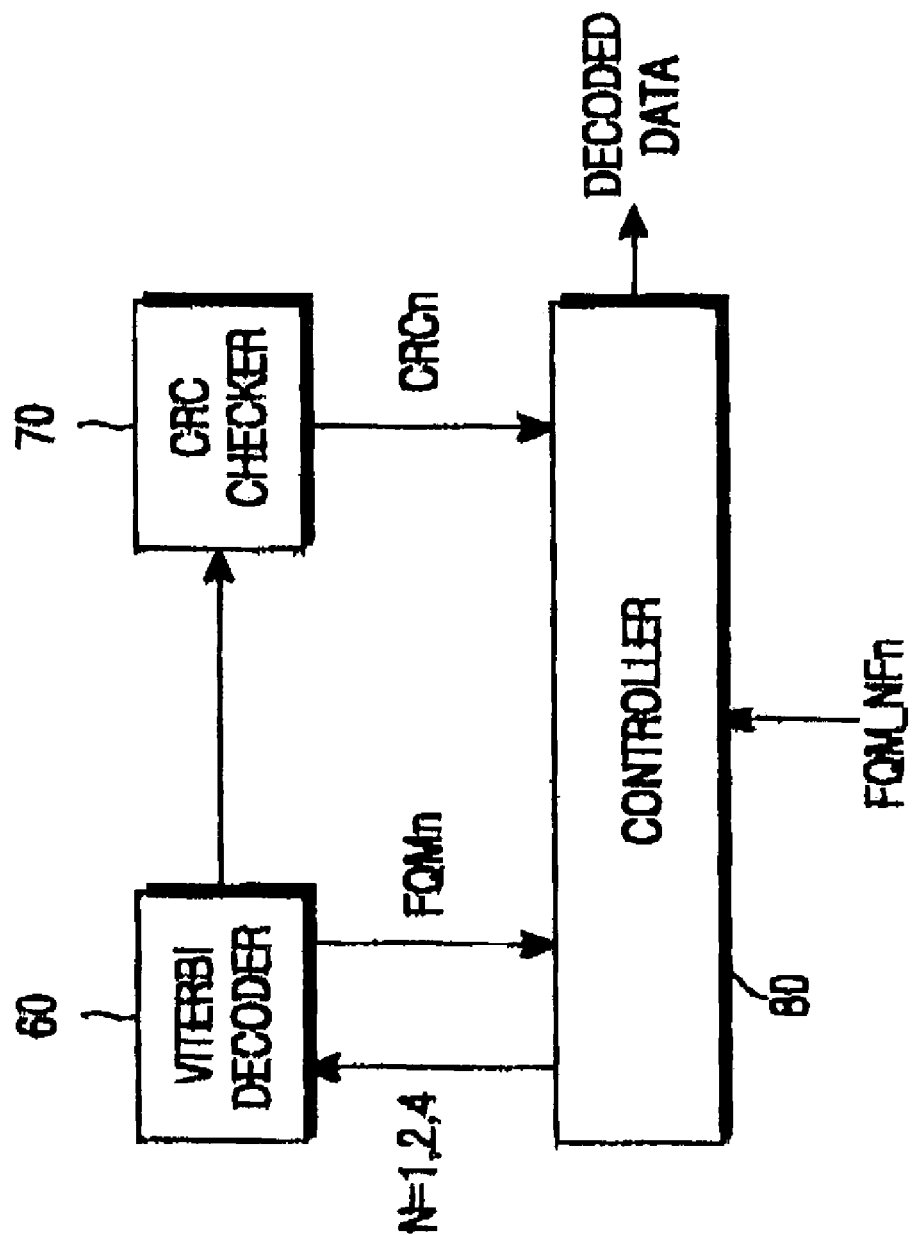
FIG. 7 is a block diagram illustrating an example of a partial structure of an SPDCCH receiver with a Viterbi decoder according to an embodiment of the present invention.

However, since calculating a symbol error rate requires more time compared with re-encoding and symbol comparison, it is not appropriate to apply the proposed method to SPDCCH of the IS-2000 1×EVDV system that requires high-speed acquisition of control information. In addition, in the case where a transmission frame having a relatively small size like the SPDCCH is used, the use of the symbol error rate decreases its accuracy as a comparison criterion, causing a reduction in overall reception performance. Meanwhile, in a system that requires accurate and high-speed processing for SPDCCH, a Viterbi decoder is used for decoding the received symbols. As is well known, the Viterbi decoder performs, on convolutionally-encoded symbols, a Viterbi decoding algorithm comprises branch metric calculation, path selection on a trellis, and trace-back. This algorithm outputs a difference between path metric values together with decoded data, each time input symbols are decoded. It can be determined that as the path metric difference becomes larger, decoding is performed more accurately. Therefore, the path metric difference can be used as a decoding reliability criterion. Accordingly, in the present invention, a difference between path metrics input to each state (or node) on a trellis is referred to as "frame quality metric (FQM)", and an accurate slot length of SPDCCH is detected using the FQM. FIG. 7 is a block diagram illustrating an example of a partial structure of an SPDCCH receiver with a Viterbi decoder according to an embodiment of the present invention. A Viterbi decoder 60, a CRC checker 70, and a controller 80 for controlling these elements are selectively illustrated in FIG. 7, and the other elements of the SPDCCH receiver are illustrated in FIG. 4.

Referring to FIG. 7, the Viterbi decoder 60, under the control of the controller 80, decodes input symbols for each of all possible slot lengths and outputs frame quality metrics FQMn (where n=1, 2, 3) together with an information bit stream. Herein, a code rate used by the Viterbi decoder 60 to perform decoding is ½ for N=1, and ¼ for N=2 or N=4, according to a slot length of SPDCCH, to be detected.

The CRC checker 70, under the control of the controller 80, receives an information bit stream decoded by the Viterbi decoder 60 for all possible slot lengths, and outputs CRC check results CRCn (where n=1, 2, 3). If the CRC check result is good (OK), the CRC checker 70 determines that decoding is successful since the information bit stream has no error. If, however, the CRC check result is bad, the CRC checker 70 determines that decoding failed since the information bit stream has an error.

Figure 8:
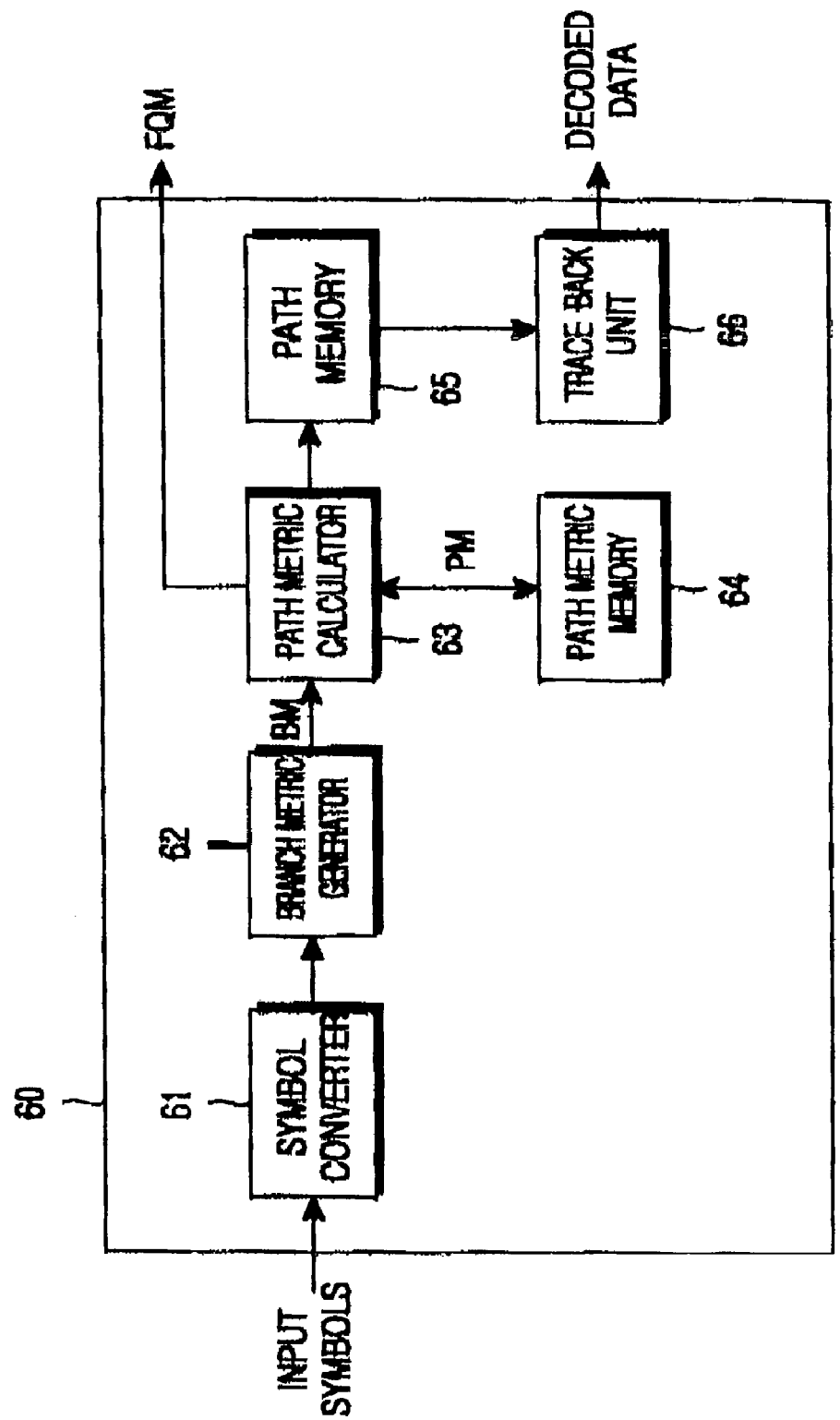
FIG. 8 is a block diagram illustrating an example of a schematic structure of a Viterbi decoder according to an embodiment of the present invention.

The controller 80 collects information bit streams, frame quality metrics FQMn and CRC check results CRCn, decoded for each of all possible slot lengths, and detects a slot length of an information bit stream having the largest frame quality metric among good-CRC (or CRC check-passed) information bit streams. In the SPDCCH receiver, the Viterbi decoder 60, as illustrated in FIG. 8, includes symbol converter 61, a branch metric generator 62, a path metric calculator 63, a path metric memory 64, a path memory 65, and a trace-back unit 66. The Viterbi decoder 60 of FIG. 8 performs decoding in such a way that it searches (detects) a code sequence most similar to an input code sequence from all possible code sequences on a particular code.

Referring to FIG. 8, the symbol converter 61, arranged in front of the branch metric generator 62, converts input symbols in the form of 2's complement into a soft decision value in the form of signed-magnitude, for decoding. The branch metric generator 62 generates branch metric values for all possible branches at a current state for the symbols in the form of the received soft decision value, and the path metric calculator 63 calculates path metric values for a surviving path toward a particular state based on the branch metric values, and stores the calculated path metric values in the path metric memory 64. In addition, an optimal surviving path having the minimum path metric value determined by comparing path metric values stored for two or more states is selected by the path metric calculator 63, and the history of the selected surviving path is stored in the path memory 65. The trace-back unit 66 then determines a decoded information bit stream by tracing-back the surviving path stored in the path memory 65.

In the forgoing description, the Viterbi decoder selects a path input to a corresponding state by comparing path metric values for received paths, at each state on a trellis expressed by paths extending from a particular state to the next state, and if a difference of path metric values between a selected surviving path and a non-selected competitor path is large, it could be said that path selection reliability is high at the state. Therefore, if a difference of path metric values between paths input to each state on the trellis is defined as a state quality metric of the state, the difference value can be used as a reliability criterion of a path input to the state. That is, it can be determined that as the state quality metric is larger, reliability of a path input to the state is higher in the Viterbi decoding process.

Since frame-based convolutional encoding is characterized in that a frame starts from a 0-state and terminates at a 0-state on a trellis, an end of the frame must converge into the 0-state on the trellis even during decoding. Therefore, at the end of a frame, a state quality metric of a 0-state can be used as a decoding reliability criterion of the entire frame. In an embodiment of the present invention, this is defined as a frame quality metric, and as the frame quality metric becomes larger, there is a higher probability that decoding on a frame is performed accurately.

A method of using a path metric difference value input to each state on a trellis as a decoding quality criterion, as described above, was proposed in 1980 by Hirosuke Yamamoto (see Hirosuke Yamamoto, Viterbi Decoding Algorithm for Convolutional Codes with Repeat Request, IEEE Transactions on Information Theory, Vol. IT-26, No. 5, September 1980). According to Yamamoto, a bit is assigned to each state on a trellis during convolutional decoding. If a path metric difference value exceeds a predetermined threshold value at a particular state, a value of a bit assigned to the state is set to '1', and if the path metric difference value does not exceed the threshold value, the value of the bit assigned to the state is set to '0'. As a result of final decoding, if an output bit is '1', it is determined that quality of the decoding result is good, and if the output bit is '0', it is determined that quality of the decoding result is bad.

Unlike this, it is possible to more accurately determine decoding quality for a plurality of decoding results by using a path metric difference value itself instead of a hard decision value determined by comparing the path metric difference value at the final state with a predetermined threshold value. Therefore, as a result of CRC check by the CRC checker 70 of FIG. 7, if CRC checks on a plurality of slot lengths are passed, the controller 80 compares path metric difference values, or frame quality metrics, obtained through decoding on each of the CRC check-passed slot lengths, and detects one slot length having the largest frame quality metric. As mentioned before, a slot length is related to a data rate. Therefore, a CRC check-passed slot length will be referred to herein as "candidate rate."

Frame quality metrics for different data rates cannot be directly compared with each other because a code rate and an input frame length have different values according to the data rate. Therefore, the controller 80 multiplies frame quality metrics for the candidate rates by proper normalization factors (NFs), for normalization, and then compares the results with one another. That is, the controller 80 compares the normalized frame quality metrics with one another, and then detects a data rate having the maximum normalized frame quality metric.

The normalization factors are determined by an input frame length of a decoder according to a code rate. An increase in a code rate causes an increase in a range of a branch metric value accumulated at every state to form a path metric value. Since the path metric value is also accumulated in a calculation process on the trellis, an increase in length of a frame results in an increase in a frame quality metric. Here, the frame length is determined by considering repetition and puncturing during the encoding process.

The frame quality metric is characterized by being inversely proportional to a data rate and directly proportional to a frame length. Therefore, if it is assumed that the number of data rates is n, code rates corresponding to the data rates are represented by $C_1, C_2, \ldots, C_n$, and frame lengths corresponding to the code rates are represented by $L_1, L_2, \ldots, L_n$ (where $L_1 \leq L_2 \leq \ldots, \leq L_n$), then a normalization factor FQM_NFi of a frame quality metric for an $i^{th}$ data rate is defined as $$FQM\_NFi = C_i * L_i / L_n \quad (1)$$

In Equation (1), FQM_NFi denotes a normalization factor for a data rate i, Ci denotes code rates of the decoder for the data rate i, Li denotes an input frame length for the data rate i, and Ln denotes a maximum frame length. For example, a secondary packet data control channel (SPDCCH) specified in IS-2000 1×EVDV standard supports 3 data rates of N=1, 2 and 4 according to its slot length N, and substantial code rates for the data rates are 37/48, 37/96, 37/192, respectively. F-PDCH with a slot length N=8, since it is identical to SPDCCH with a slot length N=4, will not be considered herein.

That is, when 37 bits including tail bits and CRC bits are received, an encoder outputs 48, 96 or 192 bits through repetition and puncturing according to the data rates. In addition, since a frame length is 37 for all data rates, Li/Ln=37/37. In that case, calculation results of Equation (1) for the data rates are (37/48)*(37/37), (37/96)*(37/37), (37/192)*(37/37), respectively. For convenience of comparison, if the three values are divided by their common multiple, the normalization factors are determined as 1, ½ and ¼.

The above normalization factor calculation is conducted based on an ideal case. In actual hardware realization, however, there exists an internal error factor of a system, generated due to quantization. Therefore, it is preferable to use an effective normalization factor calculated by adding or subtracting a compensation value calculated by experiment to/from an ideal normalization factor calculated based on the above-stated method.

Figure 9:
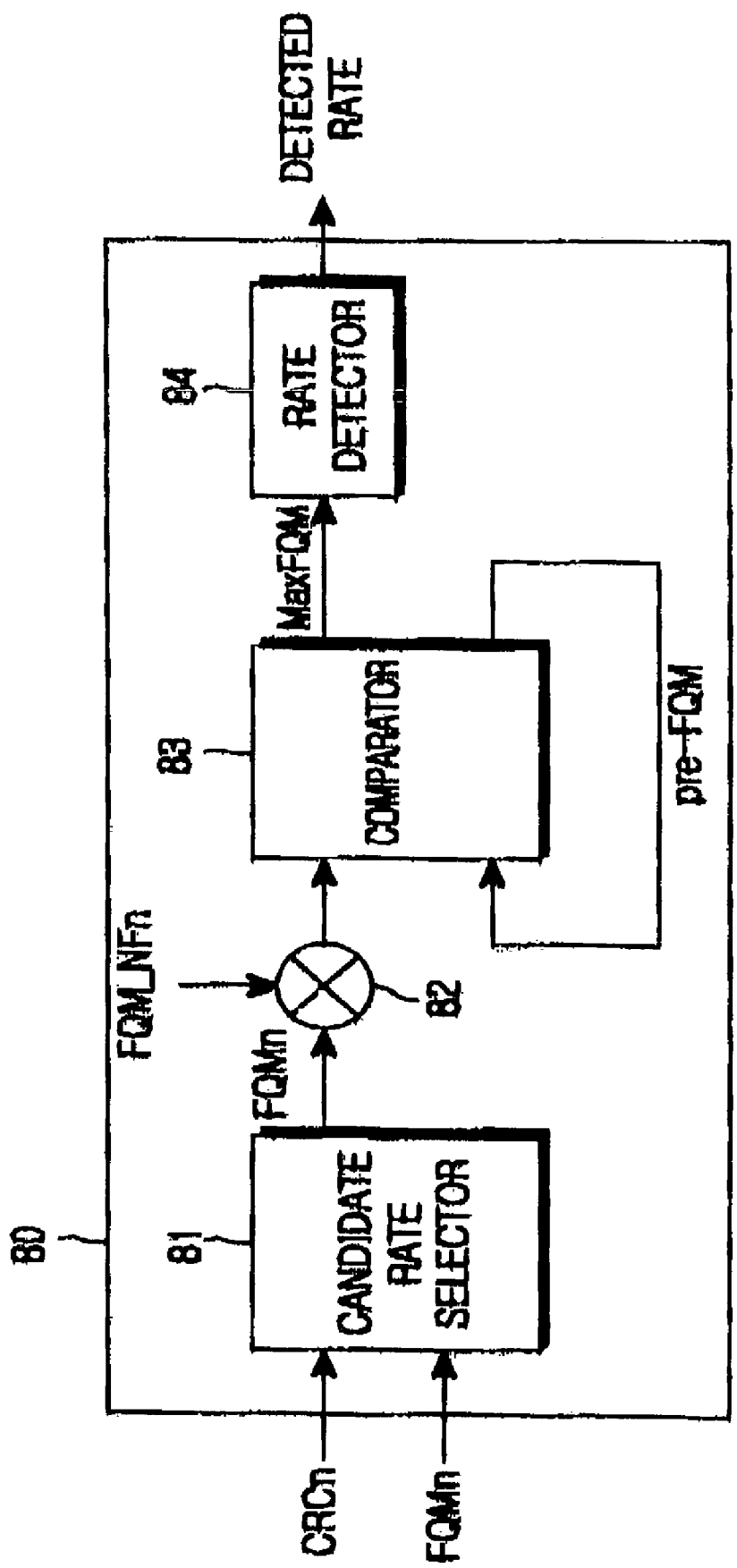
FIG. 9 is a block diagram illustrating an example of a detailed structure of a controller for detecting a data rate according to an embodiment of the present invention.

FIG. 9 is a block diagram illustrating an example of a of the controller 80 for detecting a data rate according to an embodiment of the present invention. As mentioned before, if an input frame with a corresponding size for a particular data rate n is received, the Viterbi decoder 60 decodes the input frame at a code rate corresponding to the data rate n, and provides the decoded data to the CRC checker 70 and a frame quality metric FQMn generated through the decoding to the controller 80. The CRC checker 70 provides CRC check result CRCn to the controller 80 by consulting CRC bits extracted from the decoded data.

For the data rate n, a candidate rate selector 81 in the controller 80 receives the FQMn and the CRCn and determines whether the CRCn is good. If the CRCn is good, the candidate rate selector 81 provides the frame quality metric FQMn to a multiplier 82. The multiplier 82 multiplies the FQMn by a corresponding normalization factor FQM_NFn, and provides a normalized-frame quality metric FQMn*FQM_NFn to a comparator 83. Here, the normalization factor is calculated in the above-stated method.

The comparator 83 compares the FQMn*FQM_NFn with a frame quality metric FQM(n−1)*FQM_NF(n−1) normalized for a previous candidate rate, and stores the larger one in its internal register (not shown). If there is no frame quality metric normalized for a previous candidate rate, i.e., if a frame quality metric normalized for a first candidate rate is received, the comparator 83 stores the received frame quality metric in the internal register without performing comparison. After completing the comparison on the normalized frame quality metrics for all candidate rates, the comparator 83 outputs a normalized frame quality metric MaxFQM with a maximum size. A rate detector 84 then detects a data rate corresponding to the MaxFQM.

Figure 10:
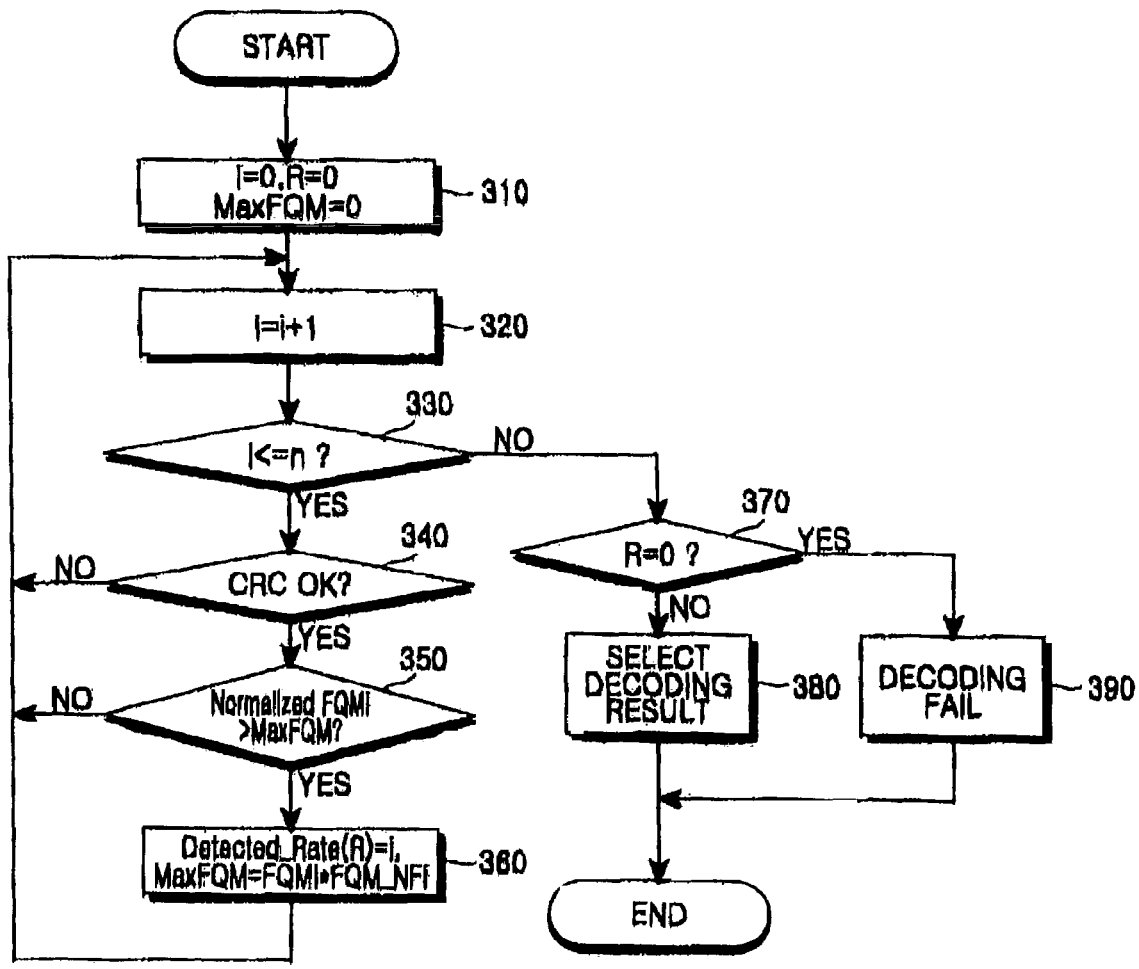
FIG. 10 is a flowchart illustrating an example of steps for detecting a data rate according to an embodiment of the present invention.

FIG. 10 is a flowchart illustrating an example of steps for detecting a data rate according to an embodiment of the present invention. The algorithm is performed by the controller 80 of FIG. 7.

Referring to FIG. 10, in step 310, the controller 80 initializes, to '0', all internal parameters for performing the data rate detection algorithm, including i for identifying data rates, R indicating an index of a detected data rate, and MaxFQM indicating a frame quality metric currently having the maximum size. The controller 80 increases the current data rate index i by 1 in step 320, and determines in step 330 whether the current data rate index i is identical to the number n of data rates. If the current data rate index i is not identical to the number n of data rates, the controller 80 proceeds to step 340.

In step 340, the controller 80 determines whether CRC check result CRCi for the current data rate index i is good (CRC OK). If the CRCi is good, the controller 80 proceeds to step 350, and otherwise, returns to step 320. In step 350, the controller 80 compares a normalized frame quality metric FQMi*FQM_NFi of a corresponding candidate rate with the MaxFQM. The normalized frame quality metric is generated by multiplying FQM_NFi by a normalization factor corresponding to the FQMi. If the FQMi*FQM_NFi is larger than MaxFQM, the controller 80 proceeds to step 360. Otherwise, the controller 80 returns to step 320 and determines a next data rate.

In step 360, the controller 80 sets the detected data rate index R to the current data rate index i, and updates the MaxFQM into FQMi*FQM_NFi corresponding to the current data rate index i. After step 360, the controller 80 returns to step 320 and determines the next data rate.

If it is determined in step 330 that the current data rate index i is identical to the number n of data rates, the controller 80 proceeds to step 370, determining that detection for all data rates has been completed. In step 370, the controller 80 determines whether the detected data rate index R is equal to '0', to determine whether there exists a detected data rate. If the detected data rate index R is equal to '0', the controller 80 performs a detection fail process in step 390, determining that there is no detected data rate. Otherwise, the controller 80 detects a data rate corresponding to the detected data rate index R in step 380.

Now, exemplary operations of detecting a data rate for a packet data control channel supporting 3 data rates of N=1, 2 and 4 will be described.

For convenience of explanation, CRC check result of data decoded based on a slot length N=1 is defined as CRC1, CRC check result of data decoded based on a slot length N=2 is defined as CRC2, and CRC check result of data decoded based on a slot length N=4 is defined as CRC3. A frame quality metric obtained based on a slot length N=1 is defined as FQM1, a frame quality metric obtained based on a slot length N=2 is defined as FQM2, and a frame quality metric obtained based on a slot length N=4 is defined as FQM3. Further, a normalization factor for a slot length N=1 is defined as FQM_NF1, a normalization factor for a slot length N=2 is defined as FQM_NF2, and a normalization factor for a slot length N=4 is defined as FQM_NF3.

As one example, if the CRC1 is good, a normalized frame quality metric FQM1*FQM_NF1 is stored as MaxFQM. If CRC2 and CRC3 are both bad, a data rate 1 corresponding to a slot length N=1 is detected.

As another example, if CRC1 is good, a normalized frame quality metric FQM1*FQM_NF1 is stored as MaxFQM. If CRC2 is bad and CRC3 is good, a normalized frame quality metric FQM3*FQM_NF3 for the slot length N=4 is compared with the MaxFQM. As a result of the comparison, if the MaxFQM is larger than the FQM3*FQM_NF3, the slot length N=1 is detected, and if the FQM3*FQM_NF3 is larger than the MaxFQM, the slot length N=4 is detected.

In a high-speed packet data transmission system that controls a packet data channel using a dedicated packet data control channel in order to increase data transmission efficiency, the present invention can reduce a demodulation time and power consumption of a packet data control channel by providing an efficient demodulation algorithm for the dedicated packet data control channel. Also, when CDM is used to simultaneously support a packet data service to a plurality of users, the present invention can reduce a demodulation time and power consumption of a packet data control channel by providing an algorithm for efficiently demodulating the packet data control channel. When the proposed demodulation algorithm for a packet data control channel is used, time delay from a reception time of a packet data channel to a demodulation time of the packet data channel can be reduced, thus contributing to rapid demodulation of the packet data channel.

Besides, in a communication system that transmits data by convolutional encoding, when a data rate of transmission data is not indicated, the present invention detects the data rate based on a frame quality metric output from a Viterbi decoder. The rate detection is accomplished along with decoding on a received data frame, preventing a waste of time due to additional calculations and an increase in calculations compared with the existing Viterbi decoder. Therefore, the proposed rate detection method can be effectively applied to a secondary packet data control channel (SPDCCH) defined by IS-2000 1×EVDV standard that requires high-speed processing.

While the invention has been shown and described with reference to a certain embodiments thereof, it will be understood by those skilled in the art that various changes in form and details may be made therein without departing from the spirit and scope of the invention as defined by the appended claims.

What is claimed is:

1. An apparatus for receiving control information transmitted from a transmitter using one of a plurality of slot lengths in a high-speed packet transmission mobile communication system, the apparatus comprising:
a decoder for receiving symbols by the slot, and for generating at least one bit stream by decoding symbols from a current slot and zero or more preceding slots for at least one possible slot length among the plurality of slot lengths according to previous decoding results, wherein the previous decoding results comprises at least one slot length, symbols of which were previously decoded to generate at least one bit stream that passed an error check;
an error checker for performing an error check on each of the at least one bit stream from the decoder; and
a controller for providing symbols of at least one succeeding slot to the decoder if the error check on all of the at least one bit stream fails, and for acquiring control information from any of the at least one bit stream having an error check that passes;
wherein the decoder further performs decoding the received symbols of the current slot if symbols of the current slot are received after an error checking passes through a previous decoding, decoding the symbols of the current slot and one preceding slot if symbols of two slots are received after an error checking passes through a previous decoding, and decoding symbols of the current slot and three preceding slots if symbols of four slots are received after an error checking passes through a previous decoding.

2. The apparatus of claim 1, wherein the any of the at least one bit stream that passes the error check corresponds to a detected slot length among the plurality of slot lengths.

3. The apparatus of claim 1, wherein the symbols to be decoded are received after symbols that were previously decoded to generate at least one bit stream that passed an error check.

4. The apparatus of claim 1, wherein the decoder is a Viterbi decoder.

5. The apparatus of claim 1, wherein the control information is provided for demodulation of packet data transmitted from the transmitter, and includes a user identifier, an automatic repeat request (ARQ) channel identifier, an encoder packet size, and a subpacket identifier.

6. The apparatus of claim 1, wherein the controller extracts a user identifier from the acquired control information, and extracts from the control information an automatic repeat request (ARQ) channel identifier, an encoder packet size and a subpacket identifier for demodulating packet data transmitted from the transmitter, if the extracted user identifier is identical to a user identifier associated with the apparatus.

7. The apparatus of claim 1, wherein the plurality of slot lengths comprise a 1-slot length, a 2-slot length, and a 4-slot length.

8. The apparatus of claim 1, wherein the decoder outputs at least one frame quality metric for the at least one bit stream along with the at least one bit stream; wherein the controller compares the at least one frame quality metrics output from the decoder for the two or more bit streams, if the number of error checking-passed bit streams is larger than or equal to two and selects the bit stream having the maximum at least one frame quality metric in order to acquire the control information.

9. The apparatus of claim 8, wherein the at least one frame quality metric represents a difference between path metric values input to a final state on a trellis according to a Viterbi decoding algorithm for the received symbols.

10. The apparatus of claim 8, wherein the controller normalizes the at least one frame quality metrics by multiplying the at least one frame quality metrics by normalization factors based on a slot length corresponding to the at least one frame quality metrics for the at least one bit streams, before comparing the at least one frame quality metrics with each other.

11. A method for receiving control information transmitted from a transmitter using one of a plurality of slot lengths at an apparatus in a high-speed packet transmission mobile communication system, the method comprising the steps of:
generating at least one bit stream by a decoder that receives symbols by the slot and decodes symbols from a current slot and zero or more preceding slots for at least one possible slot length among the plurality of slot lengths according to the number of slots from which the symbols are to be decoded;
performing an error check on each of the at least one bit stream;
if the error checking on any of the at least one bit stream passes, acquiring control information from the any of the at least one bit stream that passes; and
if the error checking on all of the at least one bit stream fails, providing symbols of at least one succeeding slot to the decoder;
wherein the decoder further performs decoding the received symbols of the current slot if symbols of the current slot are received after an error checking passes through a previous decoding, decoding the symbols of the current slot and one preceding slot if symbols of two slots are received after an error checking passes through a previous decoding, and decoding symbols of the current slot and three preceding slots if symbols of four slots are received after an error checking passes through a previous decoding.

12. The method of claim 11, wherein the any of the at least one bit stream that passes the error check corresponds to a detected slot length of the plurality of slot lengths.

13. The method of claim 11, wherein the symbols to be decoded are received after symbols that were previously decoded to generate at least one bit stream that passed an error check.

14. The method of claim 11, wherein the decoder is a Viterbi decoder.

15. The method of claim 11, wherein the control information is provided for demodulation of packet data transmitted from the transmitter, and includes a user identifier, an automatic repeat request (ARQ) channel identifier, an encoder packet size, and a subpacket identifier.

16. The method of claim 11, wherein the control information acquiring step comprises the step of extracting a user identifier from the acquired control information, and extracting from the control information an ARQ channel identifier, an encoder packet size, and a subpacket identifier for demodulating packet data transmitted from the transmitter, if the extracted user identifier is identical to a user identifier associated with the apparatus.

17. The method of claim 11, wherein the plurality of slot lengths comprise a 1-slot length, a 2-slot length and a 4-slot length.

18. The method of claim 11, wherein the decoder outputs at least one frame quality metric for the at least one bit stream along with the at least one bit stream; wherein the control information acquiring step comprises the step of comparing, if the number of error checking-passed bit streams is larger than or equal to two, the at least one frame quality metrics output from the decoder for the two or more bit streams, and selecting the bit stream having the maximum at least one frame quality metric in order to acquire the control information.

19. The method of claim 18, wherein the at least one frame quality metric represents a difference between path metric values input to a final state on a trellis according to a Viterbi decoding algorithm for the received symbols.

20. The method of claim 18, wherein the control information acquiring step comprises the step of normalizing the at least one frame quality metrics by multiplying the at least one frame quality metrics by normalization factors based on a slot length corresponding to the at least one frame quality metrics for the bit streams, before comparing the at least one frame quality metrics with each other.

21. A method for receiving control information transmitted from a transmitter over code-division-multiplexed first and second control channels using one of a plurality of slot lengths at an apparatus in a high-speed packet transmission mobile communication system, the method comprising the steps of:

generating at least one first bit stream by a first decoder that receives symbols by the slot over the first control channel and decodes symbols from a current slot and zero or more preceding slots for at least one possible slot length among the plurality of slot lengths according to the number of slots from which the symbols are to be decoded;

performing a first error check on each of the at least one first bit stream;

providing symbols from at least one succeeding slot to the first decoder until the first error check passes, if the error check on all of the at least one first bit stream fails;

acquiring first control information with a first user identifier from any of the at least one first bit stream that passes the first error check, wherein the any of the at least one first bit stream that passes corresponds to a detected slot length;

decoding symbols according to the detected slot length to generate at least one second bit stream by a second decoder that receives symbols by the slot over the second control channel, if the first user identifier is not identical to a user identifier associated with the apparatus;

performing a second error check on the at least one second bit stream; and acquiring second control information with a second user identifier from any of the at least one second bit stream, if the second error check on the any of the at least one second bit stream passes;

wherein the first decoder further performs decoding the received symbols of the current slot if symbols of the current slot are received after an error checking passes through a previous decoding, decoding the symbols of the current slot and one preceding slot if symbols of two slots are received after an error checking passes through a previous decoding, and decoding symbols of the current slot and three preceding slots if symbols of four slots are received after an error checking passes through a previous decoding.

22. The method of claim 21, wherein the symbols to be decoded are received over the corresponding first or second control channel after symbols that were previously decoded to generate at least one corresponding first or second bit stream that passed a corresponding first or second error check.

23. The method of claim 21, wherein the first and/or second decoder is a Viterbi decoder.

24. The method of claim 21, wherein the first control information is provided for demodulation of packet data transmitted from the transmitter, and includes the first user identifier, an automatic repeat request (ARQ) channel identifier, an encoder packet size, and a subpacket identifier.

25. The method of claim 21, wherein if the second user identifier is identical to a user identifier associated with the apparatus, then an ARQ channel identifier, an encoder packet size and a subpacket identifier for demodulating packet data transmitted from the transmitter are extracted from the second control information.

26. The method of claim 21, wherein the plurality of slot lengths comprise a 1-slot length, a 2-slot length and a 4-slot length.

27. The method of claim 21, wherein the first decoder outputs at least one frame quality metric for the at least one first bit stream along with the at least one first bit stream; and if the number of first error checking-passed first bit streams is larger than or equal to two, the first control information acquiring step comprises the step of comparing frame quality metrics output from the first decoder for the two or more first bit streams, , and selecting the first bit stream having the maximum at least one frame quality metric in order to acquire the first control information.

28. The method of claim 27, wherein the at least one frame quality metric represents a difference between path metric values input to a final state on a trellis according to a Viterbi decoding algorithm for the received symbols.

29. The method of claim 27, wherein the first control information acquiring step comprises the step of normalizing the at least one frame quality metrics by multiplying the at least one frame quality metrics by normalization factors based on a slot length corresponding to the at least one frame quality metrics for the first bit stream, before comparing the at least one frame quality metrics with each other.

30. The method of claim 21, wherein the second control information is provided for demodulation of packet data transmitted from the transmitter, and includes the second user identifier, an ARQ channel identifier, an encoder packet size, and a subpacket size.

31. The method of claim 21, wherein the second control information acquiring step comprises the step of extracting from the second control information an ARQ channel identifier, an encoder packet size and a subpacket identifier for demodulating packet data transmitted from the transmitter, if the second user identifier is identical to a user identifier associated with the apparatus.

32. An apparatus for receiving control information transmitted from a transmitter using one of a plurality of slot lengths in a high-speed packet transmission mobile communication system, the apparatus comprising:
- a decoder for receiving symbols by the slot, and for generating a plurality of bit streams and frame quality metrics for the bit streams by decoding symbols for each of the plurality of slot lengths;
- an error checker for performing an error check on the plurality of bit streams; and
- a controller for comparing the frame quality metrics of any of the bit streams that pass the error check, if at least two bit streams pass the error check, selecting the bit stream having the maximum frame quality metric, and acquiring control information from the selected bit stream;
- wherein the controller normalizes the frame quality metrics by multiplying the frame quality metrics by normalization factors based on a slot length corresponding to the frame quality metrics for the at least two bit streams, before comparing the frame quality metrics with each other.

33. The apparatus of claim 32, wherein the any of the bit streams that pass the error check corresponds to a detected slot length plurality of slot lengths.

34. The apparatus of claim 32, wherein the symbols to be decoded are received after symbols that were previously decoded to generate at least one bit stream that passed an error check.

35. The apparatus of claim 32, wherein decoder is a Viterbi decoder.

36. The apparatus of claim 32, wherein the frame quality metrics represents a difference between path metric values input to a final state on a trellis according to Viterbi decoding algorithm for the received symbols.

37. The apparatus of claim 32, wherein the normalization factors are determined by $$FQM\_NFi = Ci*Li/Ln$$

where FQM_NFi denotes a normalization factor for an $i^{th}$ slot length, Ci denotes a code rate of the decoder for an $i^{th}$ slot length, Li denotes a length of input symbols of the decoder for an $i^{th}$ slot length, and Ln denotes a maximum length of input symbols of the decoder.

38. A method for receiving control information transmitted from a transmitter using one of a plurality of slot lengths in a high-speed packet transmission mobile communication system, the method comprising the steps of:
- generating a plurality of bit streams and frame quality metrics for the bit streams by decoding symbols for each of the plurality of slot lengths by a decoder that receives symbols by the slot;
- performing an error check on the plurality of bit streams; and
- comparing the frame quality metrics of any of the bit streams that pass the error check, selecting the bit stream having the maximum frame quality metric, and acquiring control information from the selected bit stream, if at least two bit streams pass the error check;
- wherein the control information acquiring step comprises the step of normalizing the frame quality metrics by multiplying the frame quality metrics by normalization factors based on a slot length corresponding to the frame quality metrics for the at least two bit streams, before comparing the frame quality metrics with each other.

39. The method of claim 38, wherein the any of the bit streams that pass the error check corresponds to among the a detected slot length plurality of slot lengths.

40. The method of claim 38, wherein the symbols to be decoded are received after symbols that were previously decoded to generate at least one bit stream that passed an error check.

41. The method of claim 38, wherein decoder is a Viterbi decoder.

42. The method of claim 38, wherein the frame quality metrics represents a difference between path metric values input to a final state on a trellis according to Viterbi decoding algorithm for the received symbols.

43. The method of claim 38, wherein the normalization factors are determined by $$FQM\_NFi = Ci*Li/Ln$$

where FQM_NFi denotes a normalization factor for an $i^{th}$ slot length, Ci denotes a code rate of the decoder for an $i^{th}$ slot length, Li denotes a length of input symbols of the decoder for an $i^{th}$ slot length, and Ln denotes a maximum length of input symbols of the decoder.

* * * * *